(12) United States Patent
Ebihara et al.

(10) Patent No.: US 7,116,116 B2
(45) Date of Patent: Oct. 3, 2006

(54) CAPACITANCE DETECTING DEVICE

(75) Inventors: Hiroaki Ebihara, Fujimi-machi (JP); Mitsutoshi Miyasaka, Suwa (JP); Hiroyuki Hara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 10/958,483

(22) Filed: Oct. 6, 2004

(65) Prior Publication Data

US 2005/0134294 A1    Jun. 23, 2005

(30) Foreign Application Priority Data

Oct. 10, 2003 (JP) ............................. 2003-352946
Jul. 30, 2004 (JP) ............................. 2004-223323

(51) Int. Cl.
  *G01R 27/26* (2006.01)
(52) U.S. Cl. .................................... 324/662
(58) Field of Classification Search ............. 324/662
  See application file for complete search history.

(56) References Cited

U.S. PATENT DOCUMENTS

| 6,411,727 B1 | 6/2002 | Harkin |
| 6,438,257 B1 | 8/2002 | Morimura et al. |
| 6,448,790 B1 * | 9/2002 | Imai ........................... 324/662 |
| 2003/0222659 A1 * | 12/2003 | Miyasaka .................... 324/661 |

FOREIGN PATENT DOCUMENTS

| JP | A 11-118415 | 4/1999 |
| JP | A 11-312811 | 11/1999 |
| JP | 2000-279397 | 10/2000 |
| JP | 2000-346608 | 12/2000 |
| JP | 2000-346610 | 12/2000 |
| JP | A 2000-346608 | 12/2000 |
| JP | A 2001-056204 | 2/2001 |
| JP | A 2001-133213 | 5/2001 |
| JP | 2001-523349 | 11/2001 |
| JP | A 2003-254706 | 9/2003 |
| JP | A 2004-089675 | 3/2004 |
| JP | A 2004-102511 | 4/2004 |
| JP | 2004-213252 | 7/2004 |
| JP | 2004-220175 | 8/2004 |

OTHER PUBLICATIONS

Utsunomiya et al., "36.2 Low Temperature Poly-Si TFTs on Plastic Substrate Using Surface Free Technology by Laser Ablation/Annealing (SUFTLA™)", SID 00 Digest, pp. 916-919, 2000.

* cited by examiner

*Primary Examiner*—Anjan Deb
*Assistant Examiner*—Timothy J. Dole
(74) *Attorney, Agent, or Firm*—Oliff & Berridge, PLC

(57) ABSTRACT

To provide a superior capacitance detecting device, a capacitance detecting device includes M row lines and N column lines that are arranged in a matrix, capacitance detecting elements provided at intersections therebetween, and power lines. The capacitance detecting element includes a signal detecting element and a signal amplifying element. The signal detecting element includes a capacitance detecting electrode, a capacitance detecting dielectric film, and a reference capacitor. The signal amplifying element is composed of a thin film semiconductor device having a gate electrode, a gate insulating film, and a semiconductor film, and an electrode of the reference capacitor is connected to the row line.

21 Claims, 8 Drawing Sheets

CAPACITANCE DETECTING DEVICE

BACKGROUND OF THE INVENTION

1. Field of Invention

Exemplary aspects of the present invention relate to a capacitance detecting device that reads the surface contours of a target having minute unevenness, such as a fingerprint, by detecting capacitance which changes according to a distance from the surface of the target.

2. Description of Related Art

In related art capacitance detecting devices used for, for example, fingerprint sensors, a sensor electrode and a dielectric film provided on the sensor electrode are formed on a monocrystalline silicon substrate. See Japanese Unexamined Patent Application Publication No. 11-118415 Japanese Unexamined Patent Application Publication Nos. 2000-346608, 2001-56204 and 2001-133213. The operating principle of a related art capacitance detecting device is illustrated in FIG. 10. The sensor electrode and the dielectric film constitute an electrode and a dielectric film of a capacitor, respectively. The other electrode of the capacitor is a human body connected to the ground. The capacitance $C_F$ of this capacitor changes according to the unevenness of a fingerprint contacting the surface of the dielectric film. The semiconductor substrate is equipped with a capacitor that forms a capacitance $C_S$. These two capacitors are connected to each other in series, and a predetermined voltage is applied thereto. By application of a voltage, electric charge Q is generated between the two capacitors corresponding to the unevenness of a fingerprint. This electric charge Q is detected by using ordinary semiconductor technology, whereby the surface contours of a target are read.

SUMMARY OF THE INVENTION

However, the related art capacitance detecting devices are generally formed on a monocrystalline silicon substrate. Hence, they can be fragile and subject to breaking due to the strong finger pressure when they are used as a fingerprint sensor.

Further, fingerprint sensors, because of the application, need to be approximately 20 mm by 20 mm in size. The majority of the area of the capacitance detecting device is occupied by the sensor electrodes. The sensor electrodes are formed on a monocrystalline silicon substrate. Yet the majority of the monocrystalline silicon substrate (the lower portions of the sensor electrodes), which is made by using enormous energy and labor, serves as nothing more than a supporting member. The related art capacitance detecting devices are not only expensive, but they are also unnecessary in view of their limited function.

Furthermore, in recent years, there has been strong demand that cards, such as credit cards and bank cards, having personal identification functions, are secure. However, the related art capacitance detecting devices formed on a monocrystalline silicon substrate have poor flexibility, and therefore cannot be formed on a plastic substrate.

For this reason, thin film semiconductors may be directly provided on, for example, a plastic substrate. However, since the transistor characteristics of the thin film semiconductor formed on the plastic substrate are not as good as those of the thin film semiconductor formed on a monocrystalline silicon substrate, it is difficult to accurately read a minute variation in electric charge when a fingerprint sensor performs detection.

Accordingly, exemplary aspects of the present invention are designed to address and/or solve the above-mentioned and/or other problems. Exemplary aspects of the present invention provide a capacitance detecting device capable of sensing capacitance with high accuracy by using thin film semiconductors. Exemplary aspects of the present invention provide a superior capacitance detecting device that operates stably, can reduce the expenditure of unnecessary energy and labor during manufacture, and can be made on substrates other than a monocrystalline silicon substrate. Specifically, exemplary aspects of the present invention provide a capacitance detecting device that can be excellently operated by thin film semiconductors.

In order to achieve or address the above, a first exemplary aspect of the present invention provides a capacitance detecting device that reads surface contours of a target by detecting capacitance which changes according to a distance from the target. The capacitance detecting device includes capacitance detecting elements arranged in a matrix of M rows and N columns and power lines to supply power to the respective capacitance detecting elements. Each of the capacitance detecting elements includes a) a signal detecting element to store electric charge corresponding to capacitance, b) a reset element to reset the electric charge stored in the signal detecting element, and c) a signal amplifying element to amplify a signal corresponding to the electric charge stored in the signal detecting element. The signal detecting element includes a capacitance detecting electrode. The signal amplifying element is composed of a thin film semiconductor device for signal amplification having a source electrode, a drain electrode, and a gate electrode. The reset element is composed of a thin film semiconductor device for reset having a source electrode, a drain electrode, and a gate electrode. The gate electrode of the signal amplifying element, the capacitance detecting electrode, and the drain electrode of the reset element are connected to each other.

According to the above-mentioned structure of an exemplary aspect of the present invention, because the reset element resets the electric charge stored in the signal amplifying element, the amount of the electric charge stored in the signal detecting element varies according to whether the ridge of a fingerprint or the valley approaches the capacitance detecting electrode of the signal detecting element, thereby accurately detecting capacitance. Then, since the signal amplifying element amplifies a signal corresponding to the capacitance, it is possible to accurately detect a minute variation in capacitance even when the capacitance detecting device is formed of thin film semiconductor devices.

Herein, the meaning of the term "reset" is to keep electric charge in a predetermined amount, to make the amount of electric charge zero, which can be quantitatively grasped, in addition to nearly discharging electric charge to zero.

According to a second exemplary aspect of the present invention, a capacitance detecting device that reads surface contours of a target by detecting capacitance which changes according to a distance from the target is formed on a glass substrate using thin film semiconductors. The capacitance detecting device includes M row lines and N column lines arranged in a matrix of M rows and N columns; M×N capacitance detecting elements arranged at the intersections of the row lines and the column lines; and power lines. Each of the capacitance detecting elements includes a signal detecting element; a signal amplifying element; and a reset element. The signal detecting element includes at least a capacitance detecting electrode and a capacitance detecting dielectric film. The signal amplifying element is composed of a thin film semiconductor device for signal amplification having a source electrode, a drain electrode, and a gate electrode. Similarly, the reset element is composed of a thin film semiconductor device for reset having a source electrode, a drain electrode, and a gate electrode. A ground potential is applied to the power lines. The gate electrode of the signal amplifying element, the capacitance detecting electrode, and the drain electrode of the reset element are connected to each other. In addition, the source electrode of the reset element is connected to the power line. When the reset element is in a switched-on state, the gate electrode of the signal amplifying element, the capacitance detecting electrode, and the power line are electrically connected to each other. Further, the gate electrode of the reset element is connected to a column line adjacent to the column line locating the capacitance detecting element including the reset element.

Furthermore, according to an exemplary aspect of the present invention, when the capacitance detecting element is in a selected state, the source electrode of the thin film semiconductor device for signal amplification is electrically connected to the power line. Moreover, according to an exemplary aspect of the present invention, the capacitance detecting device may include output lines, and the drain electrode of the thin film semiconductor device for signal amplification is electrically connected to an output line when the capacitance detecting element is in the selected state. In addition, according to an exemplary aspect of the present invention, the signal amplifying element and the reset element are thin film semiconductor devices having the same conductivity type.

A third exemplary aspect of the present invention provides a capacitance detecting device that reads surface contours of a target by detecting capacitance which changes according to a distance from the target. The capacitance detecting device includes capacitance detecting elements arranged in a matrix of M rows and N columns; and power lines to supply power to the respective capacitance detecting elements. Each of the capacitance detecting elements includes a) a signal detecting element to store electric charge corresponding to the capacitance, b) a reset element to reset the electric charge stored in the signal detecting element, and c) a signal amplifying element to amplify a signal corresponding to the electric charge stored in the signal detecting element. The signal detecting element includes a1) a capacitance detecting electrode, a2) a capacitance detecting dielectric film provided on the capacitance detecting electrode, and a3) a reference capacitor. The reference capacitor has a first electrode, a second electrode, and a dielectric film provided between the first electrode and the second electrode. The signal amplifying element is composed of a thin film semiconductor device for signal amplification having a source electrode, a drain electrode, and a gate electrode. The reset element is composed of a thin film semiconductor device for reset having a source electrode, a drain electrode, and a gate electrode. The gate electrode of the signal amplifying element, the capacitance detecting electrode, the second electrode of the reference capacitor, and the drain electrode of the reset element are connected to each other.

According to the above-mentioned structure of an exemplary aspect of the present invention, the reset element resets the electric charge remaining in the signal detecting element, and the amount of the electric charge stored in the signal detecting element varies according to whether the ridge of a fingerprint or the valley approaches the capacitance detecting electrode of the signal detecting element, thereby accurately detecting capacitance. Then, since the signal amplifying element amplifies and outputs a signal corresponding to the capacitance, it is possible to accurately detect a minute variation in capacitance even when the capacitance detecting device is formed of thin film semiconductor devices. In addition, according to an exemplary aspect of the present invention, since the reference capacitor is connected to the gate electrode of the signal amplifying element, it is possible to change the voltage of the gate electrode of the signal amplifying element without being affected by the drain voltage or the drain capacitance of the signal amplifying element, and thus to enhance the accuracy of detection. In addition, it is unnecessary to extremely increase a source voltage.

According to a fourth exemplary aspect of the present invention, a capacitance detecting device that reads surface contours of a target by detecting capacitance which changes according to a distance from the target is formed on a glass substrate using thin film semiconductors. The capacitance detecting device includes M row lines and N column lines arranged in a matrix of M rows and N columns; M×N capacitance detecting elements arranged at the intersections of the row lines and the column lines; and power lines. Each of the capacitance detecting elements includes a signal detecting element, a signal amplifying element, and a reset element. The signal detecting element includes a capacitance detecting electrode, a capacitance detecting dielectric film, and a reference capacitor. The reference capacitor has a first electrode, a dielectric film, and a second electrode. The signal amplifying element is composed of a thin film semiconductor device for signal amplification having a source electrode, a drain electrode, and a gate, electrode. Similarly, the reset element is composed of a thin film semiconductor device for reset having a source electrode, a drain electrode, and a gate electrode. A ground potential is applied to the power lines. The gate electrode of the signal amplifying element, the capacitance detecting electrode, the second electrode of the reference capacitor, and the drain electrode of the reset element are connected to each other. Further, according to an exemplary aspect of the present invention, the first electrode of the reference capacitor and a column line are electrically connected to each other. When the reset element is in a switched-on state, the gate electrode of the signal amplifying element, the capacitance detecting electrode, and the second electrode of the reference capacitor are electrically connected to the power line. When the reset element in the switched-on state, the first and second electrodes of the reference capacitor have the same potential. Furthermore, according to an exemplary aspect of the present invention, the source electrode of the reset element is connected to the power line. Moreover, according to an exemplary aspect of the present invention, the gate electrode of the reset element is connected to a column line adjacent to the column line locating the capacitance detecting element including the reset element. Further, according to an exemplary aspect of the present invention, when the capacitance detecting element is in a selected state, the source electrode of the thin film semiconductor device for signal amplification is electrically connected to the power line. Furthermore, the capacitance detecting device of an exemplary aspect of the present invention further includes output lines, and the drain electrode of the thin film semiconductor device for signal amplification is electrically connected to an output line when the capacitance detecting element is in the selected state. Moreover, according to an exemplary aspect of the present invention, the signal amplifying element and the reset element are thin film semiconductor devices having the same conductivity type.

Further, according to an exemplary aspect of the present invention, a capacitance detecting device includes a signal detecting element, a signal amplifying element, a column selecting element, a row selecting element, and a reset element. Similar to the above-mentioned aspects, the signal detecting element includes a capacitance detecting electrode, a capacitance detecting dielectric film, and a reference capacitor. The reference capacitor has a first electrode, a dielectric film, and a second electrode. The signal amplifying element is composed of a thin film semiconductor device for signal amplification having a source electrode, a drain electrode, and a gate electrode. Similarly, the column selecting element is composed of a thin film semiconductor device for column selection having a source electrode, a drain electrode, and a gate electrode. The row selecting element is composed of a thin film semiconductor device for row selection having a source electrode, a drain electrode, and a gate electrode. Also, the reset element is composed of a thin film semiconductor device for reset having a source electrode, a drain electrode, and a gate electrode.

Further, according to an exemplary aspect of the present invention, the thin film semiconductor device for signal amplification, the thin film semiconductor device for column selection, and the thin film semiconductor device for row selection are connected to each other in series. The gate electrode of the signal amplifying element, the capacitance detecting electrode, the second electrode of the reference capacitor, and the drain electrode of the reset element are connected to each other. Furthermore, according to an exemplary aspect of the present invention, the first electrode of the reference capacitor and the column line are connected to each other. When the reset element in the switched-on state, the gate electrode of the signal amplifying element, the capacitance detecting electrode, and the second electrode of the reference capacitor are electrically connected to the power line. In addition, the first and second electrodes of the reference capacitor have the same potential when the reset element in the switched-on state. Furthermore, according to an exemplary aspect of the present invention, the source electrode of the reset element is connected to the column line. Moreover, according to an exemplary aspect of the present invention, the gate electrode of the reset element is connected to a column line adjacent to the column line locating the capacitance detecting element including the reset element.

Further, according to an exemplary aspect of the present invention, when the capacitance detecting element is in a selected state, the source electrode of the thin film semiconductor device for signal amplification is electrically connected to the power line. Furthermore, the capacitance detecting device of an exemplary aspect of the present invention may include output lines, and the drain electrode of the thin film semiconductor device for signal amplification is electrically connected to an output line when the capacitance detecting element is in the selected state. Moreover, according to an exemplary aspect of the present invention, the signal amplifying element and the reset element are thin film semiconductor devices having the same conductivity type. Further, according to an exemplary aspect of the present invention, the gate electrode of the thin film semiconductor device for column selection is connected to the column line. Furthermore, the reset element and the column selecting element are thin film semiconductor having the same conductivity type. Moreover, according to an exemplary aspect of the present invention, when the capacitance detecting device includes the row selecting elements, the gate electrodes of the thin film semiconductor devices for row selection are connected to the row lines.

According to an exemplary aspect of the present invention, the dielectric film of the reference capacitor and the gate insulating film of the thin film semiconductor device for signal amplification are made of the same material. These films may be formed on the same layer. An electrode of the reference capacitor is made of the same material as a drain region of the thin film semiconductor device for signal amplification. This electrode and the drain region of the thin film semiconductor device for signal amplification are formed on the same layer. Further, the other electrode of the reference capacitor is made of the same material as the gate electrode of the thin film semiconductor device for signal amplification. These electrodes may be formed on the same layer.

Furthermore, according to an exemplary aspect of the present invention, a reference capacitor capacitance CR and a transistor capacitance CT of the thin film semiconductor device for signal amplification are defined by the following expressions:

$$C_R = \epsilon_0 \cdot \epsilon_R \cdot S_R / t_R$$

$$C_T = \epsilon_0 \cdot \epsilon_{ox} \cdot S_T / t_{ox}$$

where $\epsilon_0$ is a dielectric constant in vacuum, $S_R$ (μm²) is the electrode area of the reference capacitor, $t_R$ (μm) is the thickness of the reference capacitor dielectric film, $\epsilon_R$ is a relative dielectric constant of the reference capacitor dielectric film, $S_T$ (μm²) is the gate electrode area of the thin film semiconductor device for signal amplification, $t_{ox}$ (μm) is the thickness of the gate insulating film, and $\epsilon_{ox}$ is a relative dielectric constant of the gate insulating film. In addition, an element capacitance $C_D$ of the signal detecting element is defined by the following expression:

$$C_D = \epsilon_0 \cdot \epsilon_D \cdot S_D / t_D$$

where $\epsilon_0$ is a dielectric constant in vacuum, $S_D$ (μm²) is the area of the capacitance detecting electrode, $t_D$ (μm) is the thickness of the capacitance detecting dielectric film, and $\epsilon_D$ is a relative dielectric constant of the capacitance detecting dielectric film. In this case, the element capacitance $C_D$ is sufficiently larger than the sum of the reference capacitor capacitance $C_R$ and the transistor capacitance $C_T$, that is, $C_R + C_T$. Ideally, the reference capacitor capacitance $C_R$ is sufficiently larger than the transistor capacitance $C_T$. Thus, the element capacitance $C_D$ is sufficiently larger than the reference capacitor capacitance $C_R$. Further, according to an exemplary aspect of the present invention, the capacitance detecting dielectric film is positioned on an uppermost surface of the capacitance detecting device. Furthermore, the target to be measured is not brought into contact with the capacitance detecting dielectric film, but is separated therefrom by a target distance $t_A$. When a target capacitance $C_A$ is defined by the following equation:

$$C_A = \epsilon_0 \cdot \epsilon_A \cdot S_D / t_A$$

where $\epsilon_0$ is a dielectric constant in vacuum, $\epsilon_A$ is a relative dielectric constant of air, and $S_D$ is the area of the capacitance detecting electrode, the reference capacitor capacitance $C_R$ is sufficiently larger than the target capacitance $C_A$. In this case, ideally, the reference capacitor capacitance $C_R$ is sufficiently larger than the transistor capacitance $C_T$.

Further, an exemplary aspect of the present invention is characterized in that the capacitance detecting dielectric film is positioned on the uppermost surface of the capacitance detecting device; that, when a reference capacitor capacitance $C_R$ and a transistor capacitance $C_T$ of the thin film semiconductor device for signal amplification are defined by the following expressions:

$$C_R = \epsilon_0 \cdot \epsilon_R \cdot S_R / t_R$$

$$C_T = \epsilon_0 \cdot \epsilon_{ox} \cdot S_T / t_{ox}$$

where $\epsilon_0$ is a dielectric constant in vacuum, $S_R$ ($\mu m^2$) is the electrode area of the reference capacitor, $t_R$ ($\mu m$) is the thickness of the reference capacitor dielectric film, $\epsilon_R$ is a relative dielectric constant of the reference capacitor dielectric film, $S_T$ ($\mu m^2$) is the gate electrode area of the thin film semiconductor device for signal amplification, $t_{ox}$ ($\mu m$) is the thickness of the gate insulating film, and $\epsilon_{ox}$ is a relative dielectric constant of the gate insulating film, and when an element capacitance $C_D$ of the signal detecting element is defined by the following expression:

$$C_D = \epsilon_0 \cdot \epsilon_D \cdot S_D / t_D$$

where $\epsilon_0$ is a dielectric constant in vacuum, $S_D$ ($\mu m^2$) is the area of the capacitance detecting electrode, $t_D$ ($\mu m$) is the thickness of the capacitance detecting dielectric film, and $\epsilon_D$ is a relative dielectric constant of the capacitance detecting dielectric film, then the element capacitance $C_D$ is sufficiently larger than the sum of the reference capacitor capacitance $C_R$ and the transistor capacitance $C_T$, that is, $C_R + C_T$; and that, when a target capacitance $C_A$ is defined by the following expression:

$$C_A = \epsilon_0 \cdot \epsilon_A \cdot S_D / t_A$$

where $\epsilon_0$ is a dielectric constant in vacuum, $\epsilon_A$ is a relative dielectric constant of air, $t_A$ is a distance between the target and the capacitance detecting dielectric film, and $S_D$ is the area of the capacitance detecting electrode, then the reference capacitor capacitance $C_R$ is sufficiently larger than the target capacitance $C_A$. In this case, ideally, the reference capacitor capacitance $C_R$ is sufficiently larger than the transistor capacitance $C_T$. Thus, the element capacitance $C_D$ is sufficiently larger than the reference capacitor capacitance $C_R$, and the reference capacitor capacitance $C_R$ is sufficiently larger than the target capacitance $C_A$.

[Advantages]

As described above, according to an exemplary aspect of the present invention, since a capacitance detecting device includes signal amplifying elements to amplify a signal corresponding to capacitance and reset elements to reset the capacitance, it is possible to sense capacitance with high accuracy by using thin film semiconductor devices.

DETAIL DESCRIPTION OF EXEMPLARY EMBODIMENTS

Hereinafter, exemplary embodiments of the present invention will be described with reference to the accompanying drawings.

First Exemplary Embodiment

A first exemplary embodiment of the present invention provides a capacitance detecting device that reads out the surface contours of a target by detecting capacitance which changes according to the distance from the target. The capacitance detecting device is manufactured using thin film semiconductor devices composed of a metal layer, an insulating layer, and a semiconductor layer.

Since the thin film semiconductor devices are ordinarily formed on glass substrates, semiconductor integrated circuits requiring a large area can be inexpensively fabricated by using the thin film semiconductor devices. Specifically, they have been recently applied to, for example, liquid crystal display devices. Therefore, when a capacitance detecting device applied to a fingerprint sensor is fabricated by using the thin film semiconductor devices, it is not necessary to use an expensive substrate, such as a monocrystalline silicon substrate, whose production consumes tremendous energy. The device can be fabricated inexpensively without wasting precious global resources. A semiconductor integrated circuit made up of thin film semiconductor devices can be fabricated on a plastic substrate by applying a transfer technique called SUFTLA (which is disclosed in Japanese Unexamined Patent Application Publication No. 11-312811 and S. Utsunomiya et. al., "Society for Information Display", pp. 916 (2000)). Therefore, the capacitance detecting device does not have to be formed on a monocrystalline silicon substrate, but can be formed on a plastic substrate.

Figure 10:
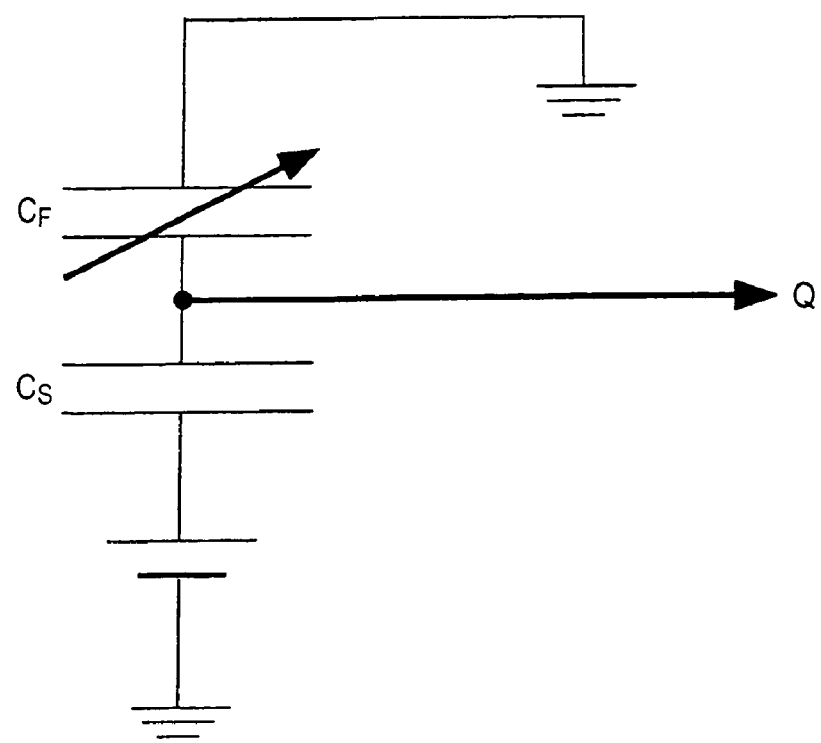
FIG. 10 is a schematic illustrating the operating principle of the related art.

As shown in FIG. 10, it is impossible to fabricate a capacitance detection device to which a related art operating principle is applied using thin film semiconductor devices with the current technology of fabricating thin film semiconductor devices. Since electric charge Q that is induced between two capacitors connected to each other in series is extremely small, the electric charge Q can be accurately read if monocrystalline silicon LSI technology, which enables high-accuracy detection, is used. However, the electric charge Q cannot be accurately read with a thin film semiconductor device. This is because the transistor characteristics in a thin film semiconductor device are not as good as the transistor characteristics obtained with the monocrystalline silicon LSI technology, and because there is a large degree of deviation in characteristics between thin film semiconductor devices.

Further, the capacitance detecting device of the present exemplary embodiment includes M row lines (M is an integer of 1 or more) and N column lines (N is an integer of 1 or more) arranged in a matrix of M rows and N columns. M×N capacitance detecting elements provided at the intersections of the respective row lines and the respective column lines, and power lines. The capacitance detecting elements each includes a signal detecting element, a signal amplifying element, and a reset element. The signal detecting element includes at least a capacitance detecting electrode and a capacitance detecting dielectric film.

As described later, the signal detecting element may include a reference capacitor in order to increase detection sensitivity at a low voltage. When the signal detecting element includes the reference capacitor, the reference capacitor includes a first electrode, a dielectric film, and a second electrode.

When a target, such as a finger, approaches or comes into contact with the capacitance detecting dielectric film, a potential $V_G$ is generated corresponding to the capacitance between the target and the capacitance detecting electrode. In the present exemplary embodiment, the potential $V_G$ is amplified and inverted into a current or voltage by the signal amplifying element provided in each capacitance detecting element. Specifically, the signal amplifying element includes a gate electrode, a gate insulating film, and a semiconductor film, and is composed of a thin film semiconductor device for signal amplification having a source electrode, a drain electrode, and a gate electrode. Similarly, the reset element includes a gate electrode, a gate insulating film, and a semiconductor film, and is composed of a thin film semiconductor device for reset having a source electrode, a drain electrode, and a gate electrode. The gate electrode of the signal detecting element, the capacitance detecting electrode, and the drain electrode of the reset element are connected to each other.

Further, when the signal detecting element includes the reference capacitor, an electrode of the reference capacitor is connected to a column line, and the other electrode thereof is connected to the capacitance detecting electrode, the gate electrode of the thin film semiconductor device for signal amplification, and the drain electrode of the reset element. For example, when the column line and the first electrode of the reference capacitor are electrically connected to each other, the second electrode of the reference capacitor is electrically connected to the capacitance detecting electrode, the gate electrode of the thin film semiconductor device for signal amplification, and the drain electrode of the reset element. When the second electrode of the reference capacitor and the column line are electrically connected to each other, the first electrode of the reference capacitor is electrically connected to the capacitance detecting electrode, the gate electrode of the thin film semiconductor device for signal amplification, and the drain electrode of the reset element.

The description of the present invention does not distinguish a source electrode from a drain electrode of a thin film semiconductor device for the sake of convenience. Herein, an electrode of a thin film semiconductor device is referred to as a source electrode, and another electrode is referred to as a drain electrode. Strictly speaking in a physical conception, in an N-type transistor, an electrode having a lower potential is defined as a source electrode. On the other side, in a P-type transistor, an electrode having a higher voltage is defined as a source electrode. Which electrode has a higher potential depends on the operating state of a transistor. Therefore, strictly speaking, the positions of a source electrode and a drain electrode are always changeable in a transistor. The description of the present invention excludes such strictness for the purpose of the clarity of explanation, and thus an electrode is referred to as a source electrode, and another electrode is referred to as a drain electrode for the sake of convenience.

Figure 1:
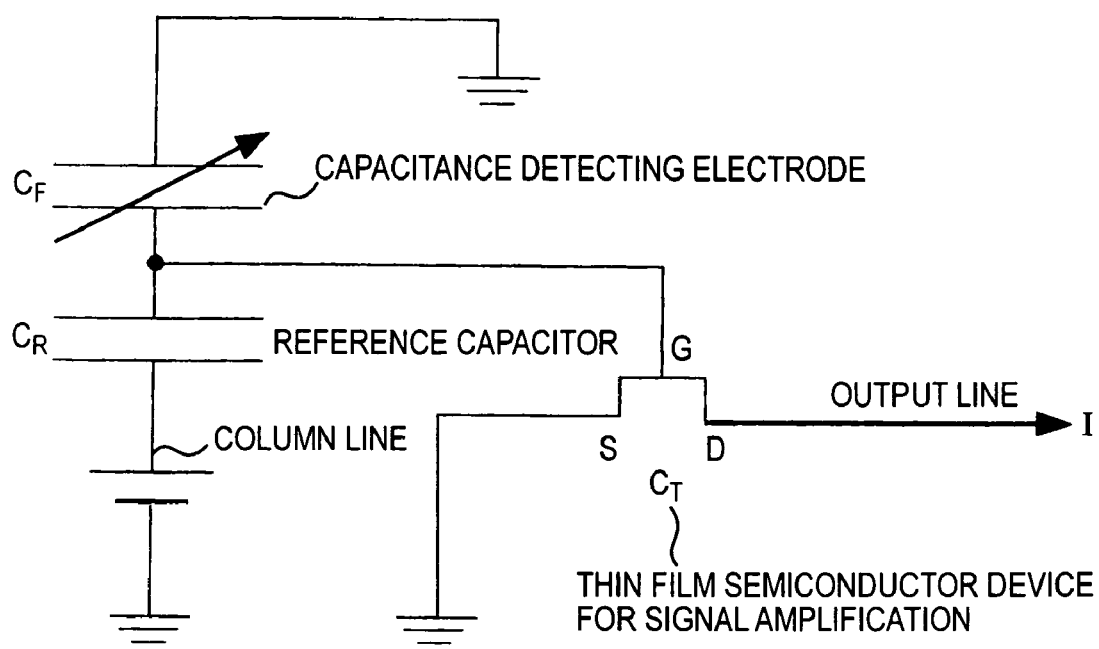
FIG. 1 is a schematic illustrating the operating principle of an exemplary aspect of the present invention.

First, the basic operating principles of an exemplary aspect of the present invention having the above-mentioned structure will be described with reference to FIG. 1. A potential $V_G$ induced between a capacitor having capacitance $C_F$ that varies according to the surface contours of a target and resultant capacitance $C_R + C_T$ of a reference capacitor having capacitance $C_R$ and a thin film semiconductor device for signal amplification having capacitance $C_T$ is connected to a gate electrode (which is indicated by reference numeral "G" in FIG. 1) of the thin film semiconductor device for signal amplification to change the gate potential of the semiconductor device. When a predetermined voltage is applied to a drain region (which is indicated by alphabet "D" in FIG. 1) of the thin film semiconductor device, a current $I_{ds}$ flowing between the source and drain of the thin film semiconductor device is modulated corresponding to the induced gate potential $V_G$. The electric charge Q corresponding to the potential $V_G$ is stored in the gate electrode. But the electric charge is holed without flowing anywhere, whereby the current value $I_{ds}$ is kept uniform. Therefore, a high drain voltage or a long measuring time can be obtained, and thus it is possible to easily measure the current value $I_{ds}$ and to more accurately detect the surface contours of a target using the thin film semiconductor devices. The signal (a current or voltage) obtained by amplifying information on the capacitance of a target is read out through an output line.

In order to measure the capacitance of a target, the current $I_{ds}$ passing through the signal amplifying element may be measured, or a voltage V corresponding to the current $I_{ds}$ passing through the signal amplifying element may be measured. When the reference capacitor is not provided, in the above-mentioned construction, the capacitance $C_R$ is set to zero, and the capacitance of a target is measured using the transistor capacitance $C_T$ and the capacitance $C_F$ varying according to the surface contours of a target in the same principle as described above. Hereinafter, an example in which a reference capacitor is provided will be described below as an exemplary embodiment of the present invention. It is also effective to allow the reference capacitor to function as a transistor capacitance of the signal amplifying element.

Figure 2:
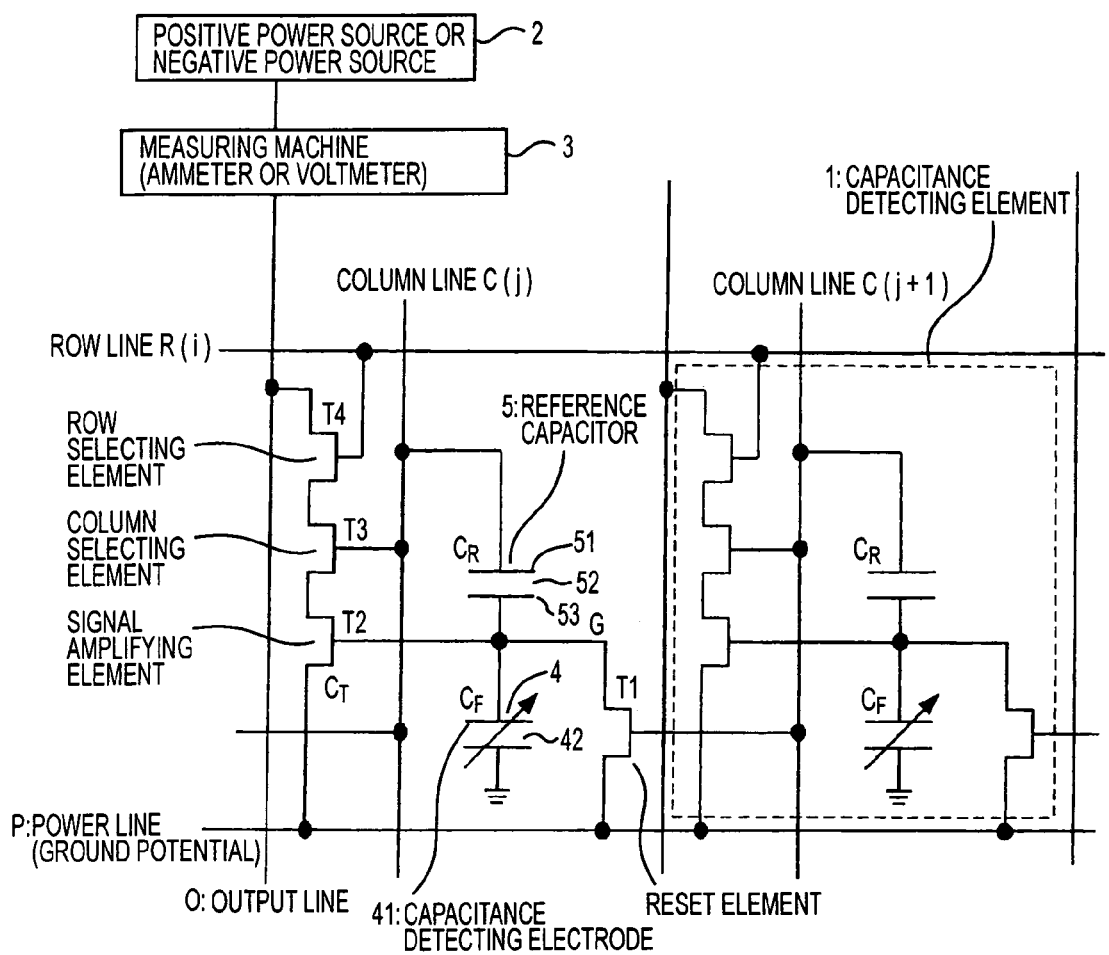
FIG. 2 is a schematic illustrating the circuit structure of a capacitance detecting element according to a first exemplary embodiment of the present invention.

Next, the circuit structure of the capacitance detecting element according to an exemplary aspect of the present invention will be described with reference to FIG. 2. As described above, each capacitance detecting element 1 includes a signal amplifying element T2 and a signal detecting element (4 or 5), which are indispensable components, and a reset element T1. The signal detecting element (4 or 5) has at least a capacitance detecting electrode 41 and a capacitance detecting dielectric film 42, and may further include a reference capacitor 5. The reference capacitor 5 includes a first electrode 51, a dielectric film 52, and a second electrode 53. The gate electrode of the signal amplifying element T2, the capacitance detecting electrode 41, an electrode (the second electrode 53) of the reference capacitor 5, and the drain electrode of the reset element T1 are connected to each other. Such a structure enables the gate electrode of the signal amplifying element T2, the second electrode 53 of the reference capacitor, and the capacitance detecting electrode 41 to be set to ground potential when the reset element T1 is selected to be a switched-on state. Specifically, elements are arranged such that the drain electrode of the reset element T1 has a ground potential when a power line P to which the ground potential is applied is connected to the source electrode of the reset element T1, and a reset selection signal is input to the gate electrode of the reset element T1 to allow the reset element T1 to be a switched-on state. At the same time, the reference capacitor 5 is also arranged such that its first electrode 51 has the ground potential. In this way, the potentials of the gate electrode of the signal amplifying element, the capacitance detecting electrode, and the second electrode of the reference capacitor fall to the ground potential for a period of time when the reset selection signal is supplied. At the same time, the reference capacitor is also arranged such that its first electrode has the ground potential. By such wiring and arrangement of the elements, it is possible to select the capacitance detecting element 1 to discharge unnecessary electric charge from the gate electrode of the signal amplifying element T2 and the capacitance detecting electrode 41 before measuring the capacitance of a target, thereby enhancing the accuracy of detection.

The signal amplifying element T2 according to the present exemplary embodiment is arranged between the power line P and an output line O. For example, a source electrode of the thin film semiconductor device for signal amplification, which is a signal amplifying element T2, is electrically connected to the power line P, and a drain thereof is electrically connected to the output line O.

The term "electrical connection" means a state in which two members are electrically connected to each other through a switching element. Of course, the drain electrode may be directly connected to the output line, and the source electrode may be directly connected to the power line.

The capacitance detecting device according to an exemplary aspect of the present invention reads out the surface contours of a target by sequentially selecting the respective capacitance detecting elements 1 arranged in a matrix by the column lines C and the row lines R. FIG. 2 shows the structure of each capacitance detecting element 1 including a column selecting element T3 and a row selecting element T4. With such structure, the respective capacitance detecting elements 1 are uniquely selected to reduce or prevent the information interference between the capacitance detecting elements 1, thereby realizing high-accuracy detection at high speed. Specifically, the column selecting element T3 is composed of a thin film semiconductor device for column selection having a gate electrode, a gate insulating film, and a semiconductor film, and the row selecting element T4 is also composed of a thin film semiconductor device for row selection having a gate electrode, a gate insulating film, and a semiconductor film. When the capacitance detecting element 1 according to an exemplary aspect of the present invention includes the column selecting element T3 and the row selecting element T4, the thin film semiconductor device for signal amplification, which form the signal amplifying element T2, the thin film semiconductor device for column selection, and the thin film semiconductor device for row selection are connected to each other in series. The column selecting element T3 is provided in each of the capacitance detecting elements 1 to uniquely perform column selection, thereby reducing or preventing the information interference between columns. In addition, the row selecting element T4 is also provided in each of the capacitance detecting elements 1 to uniquely perform row selection, thereby reducing or preventing the information interference between rows.

Therefore, it is possible to select only one capacitance detecting element 1 connected to a column line C and a row line R from the M×N capacitance detecting elements 1. When the capacitance detecting element 1 includes the column selecting element T3 and the row selecting element T4, the gate electrode of the thin film semiconductor device for column selection is connected to the column line C, and the gate electrode of the thin film semiconductor device for row selection is connected to the row line R. In FIG. 2, an N-type transistor is used for the row selecting element T4. Therefore, a low potential ($V_{ss}$) is applied to non-selected row lines, and a high potential ($V_{dd}$) is applied to a selected row line R (for example, an i-th row line). Similarly, in FIG. 2, an N-type transistor is used for the column selecting element T3. Therefore, the low potential ($V_{ss}$) is applied to non-selected column lines C, and the high potential ($V_{dd}$) is applied to a selected column line C (for example, an j-th column line).

In such a structure, first, a row line R (for example, an i-th row line) is selected. Then, all the row selecting elements T4 connected to the row line R are simultaneously switched to a transistor-on state. In this state, a specific column line C (for example, an j-th column line) is selected. Only when the specific column line C (for example, an j-th column line) is selected from the N column lines C, the high potential ($V_{dd}$) is applied to the selected column line C (the j-th column line), so that the electric conductivity of the column selecting elements T3 connected to the column line C (the j-th column line) increases, whereby the column selecting elements T3 are switched to the transistor-on state. As a result, the electric conductivity between the power line P and the output line O is determined by the signal amplifying element T2. Since the first electrode 51 of the reference capacitor 5 is connected to the column line C that has already been in the selected state, a high potential is applied to the reference capacitor 5. The potential corresponding to the capacitance of a target is applied to the gate electrode of the signal amplifying element T2. Only the capacitance detecting element 1 (a capacitance detecting element located at an intersection of an i-th row and a j-th column) located at an intersection of the row line R (an i-th row) and the column line C (a j-th column) selected in this way is selected from a group of M×N capacitance detecting elements. Thus it is possible to measure the capacitance of a target at that position. Of course, a P-type transistor may be used for the column selecting element T3. The high potential ($V_{dd}$) may be applied to the gate electrodes of the P-type transistors in a non-selected state, and the low potential ($V_{ss}$) may be applied thereto in a selected state. In addition, a p-type transistor may be used for the row selecting element T4. The high potential ($V_{dd}$) may be applied to the gate electrodes of the P-type transistors in a non-selected state, and the low potential ($V_{ss}$) may be applied thereto in a selected state.

In the present exemplary embodiment, the gate electrode of the reset element T1 is connected to a column line C adjacent to the column line C positioning the capacitance detecting element 1 including the reset element T1. That is, a drain electrode of a reset element T1 in a capacitance detecting element 1 located in a j-th column is connected to a capacitance detecting electrode 41, a gate electrode of a signal amplifying element T2 that are located in the j-th column, and a gate electrode of the reset element T1 is connected to a (j+1)-th column line (a rear column line of the j-th column line) or a (j−1)-th column line C (a front column line of the j-th column line) adjacent to the j-th column line. In this way, a column selection signal to be supplied to the capacitance detecting element 1 through the (j+1)-th column line or (j−1)-th column line can be used as the reset selection signal relating to the reset element T1 of the capacitance detecting element 1 located in the j-th column. Of course, the effects obtained when the gate electrode of the reset element T1 is connected to another column line C other than the column line positioning the capacitance detecting element 1 may be the same as in the case in which the gate electrode is not connected to an adjacent column line C. However, by connecting the gate electrode of the reset element T1 to the adjacent column line, it is possible to remove a surplus wiring line and thus to reduce parasitic capacitance. In addition, as described above, the reset element according to the present exemplary embodiment is to discharge unnecessary electric charge from the gate electrode of the signal amplifying element T2 and the capacitance detecting electrode 41 before selecting a capacitance detecting element 1 to measure the capacitance of a target. Therefore, the reset element T1 may become a switched-on state immediately before the capacitance detecting element 1 including the reset element T1 is selected. For example, ideally, when the column selection is performed from a low-numbered column line (that is, the column selection is performed in the order of a (j−1)-th column line, a j-th column line, and a (j+1)-th column line), a gate electrode of a reset element T1 in a capacitance detecting element 1 belonging to the j-th column is connected to the (j−1)-th column line C. On the contrary, when the column selection is performed from a high-numbered column line (that is, the column selection is performed in the order of the (j+1)-th column line, the j-th column line, and the (j−1)-th column line), the gate electrode of the reset element T1 in the capacitance detecting element 1 belonging to the j-th column is connected to the (j+1)-th column line C. When the column selection is performed from the high-numbered column line (that is, the column selection is performed in the order of the (j+1)-th column line, the j-th column line, and the (j−1)-th column line), and when the gate electrode of the reset element T1 of the capacitance detecting element 1 belonging to the j-th column is connected to the (j+1)-th column line C, which is a rear column line of the j-th column line, reset is performed on a j-th column while the capacitance detecting elements 1 located at the next column (the (j+1)-th column) are operating. In FIG. 2, since an N-type transistor is used for the rest element T1, a circuit is constructed such that the low potential ($V_{ss}$) is applied to the column lines C in a non-selected state and the high potential ($V_{dd}$) is applied thereto only in a selected state. Therefore, when the (j+1)-th column line adjacent to the j-th column line is selected, the reset element T1 of the capacitance detecting element 1 located in the j-th column becomes a switched-on state. Since the reset element T1 and the column selecting element T3 perform an on or off switching operation by the same signal, it is preferable that the reset element T1 and the column selecting element T3 be transistors having the same conductivity type, from the viewpoint of a simple circuit structure. For example, when the reset element T1 is an N-type transistor, the column selecting element T3 is also an N-type transistor. In this way, it is possible to utilize the reset signal to be supplied to the reset element T1 of the current column line as the selection signal to be supplied to an adjacent column line, without using an element such as an inverter. In addition, when a P-type transistor is used for the reset element T1, the high potential ($V_{dd}$) is applied to the column line C in a non-selected state, and the low potential ($V_{ss}$) is applied thereto only in a selected state. Therefore, even in this case, the same effects can be obtained. In addition, a P-type transistor is used for the column selecting element T3.

According to the present exemplary embodiment, transistors having the same conductivity type are used for the reset element T1 and the signal amplifying element T2. As described later, when a positive potential is supplied as a source voltage, that is, when a ground potential of the low potential ($V_{ss}$) and the high potential ($V_{dd}$) are used, the potential of the column line C varies between the ground potential ($V_{ss}$) and the high potential ($V_{dd}$). As shown in FIG. 2, it is considered that the first electrode 51 of the reference capacitor 5 is connected to the column line C, and that the capacitance detecting dielectric film 42 is directly connected to a target, which is the ground potential, or is connected thereto through the air. Therefore, the potentials of the second electrode 53 of the reference capacitor 5, the capacitance detecting electrode 41, and the gate electrode of the signal amplifying element T2 also vary between the ground potential ($V_{ss}$) and the high potential ($V_{dd}$). In this case, since the source electrode of the signal amplifying element T2 is electrically connected to the power line P having the ground potential, the signal amplifying element T2 may be formed of an N-type transistor in which a sufficient on-current is received even when the potentials of the source and drain are close to the ground potential. Similarly, the source electrode of the reset element T1 is also connected to the power line P, and the potential of the column line C varies between the ground potential ($V_{ss}$) and the high potential ($V_{dd}$). Therefore, the reset element T1 may be an N-type transistor. When a negative potential is used as the source voltage, that is, when the ground potential which is the high potential ($V_{dd}$) and the low potential ($V_{ss}$) are used, the source electrode of the signal amplifying element T2 is electrically connected to the ground potential, so that the potential of the source electrode of the signal amplifying element T2 varies between the low potential ($V_{ss}$) and the ground potential ($V_{dd}$). In addition, the source electrode of the reset element T1 is connected to the power line P having the ground potential, and the potential of the column line C to which the gate electrode is connected varies between the low potential ($V_{ss}$) and the ground potential ($V_{dd}$). Therefore, in this case, the signal amplifying element T2 and the reset element T1 may be P-type transistors.

In the present exemplary embodiment, the power lines P and the output lines have various forms since the respective capacitance detecting elements 1 are selected one by one. The power lines P provided in the capacitance detecting device may have the same number of lines as the N column lines C and be arranged in the column direction. Also, the power lines P may have the same number of lines as the M row lines R and be arranged in the row direction. In addition, one power line may be provided for every two column lines, or may be provided for every two row lines. Similarly, the output lines O provided in the capacitance detecting device may have the same number of lines as the N column lines C and extend in the column direction. Also, the output lines O may have the same number of lines as the M row lines R and extend in the row direction. In addition, one output line may be provided for every two column lines, or may be provided for every two row lines. In FIG. 2, the number of power lines P is equal to the number of row lines R, that is, M, and the power lines P are arranged in the row direction. In addition, the number of output lines O is equal to the number of column lines C, that is, N, and the output lines O extend in the column direction.

When each capacitance detecting element 1 includes the column selecting element T3 and the row selecting element T4, there is an advantage in that only a specific capacitance detecting element will be reliably selected from a group of M×N capacitance detecting elements as described above. If the reference capacitor 5 is not provided in the capacitance detecting element, the transistor capacitance of the signal amplifying element T2 is capacitively coupled with the capacitance of a target, and the product of the capacitance ratio thereof and the drain voltage is applied to the gate of the signal amplifying element T2. However, since the column selecting element T3, the row selecting element T4, and the signal amplifying element T2 are connected to each other in series, the drain potential of the signal amplifying element T2 drops from the high potential ($V_{dd}$) applied to the output line O by the potential corresponding to the presence of the column selecting element T3 and the row selecting element T4. For example, assuming that the electric conductivities of the column selecting element T3, the row selecting element T4, and the signal amplifying element T2 are equal to each other in their on states, the drain potential of the signal amplifying element T2 when the potential ($V_{dd}$) is applied to the output line O drops to about one third of the potential ($V_{dd}$), that is, $V_{dd}/3$. Therefore, even though the capacitance of a target to be measured varies, a variation in the gate potential of the signal amplifying element T2 decreases by a maximum of $V_{dd}/3$, and then the accuracy of detection decreases. Thus, the increase of the value of $V_{dd}$ is required. In the present exemplary embodiment, in order to solve and/or address the above and/or other problems, the reference capacitor 5 is further provided, and the first electrode 51 of the reference capacitor 5 is directly connected to the column line C. Then, for example, even when the column selecting element T4 or the row selecting element T3 is provided, the gate potential of the signal amplifying element T2 is in a potential range of the minimum $V_{ss}$ to the maximum $V_{dd}$ since the high potential ($V_{dd}$) is surely applied to the first electrode 51 of the reference capacitor 5. That is, according to the structure of the present exemplary embodiment, for example, even when the column selecting element T4 and the row selecting element T3 are connected to the signal amplifying element T2 in series between the power line P and the output line O, the gate potential of the signal amplifying element T2 can vary in the range of a negative source potential ($V_{ss}$: the ground potential) to a positive source potential ($V_{dd}$: the high potential) according to the capacitance of a target. When the gate potential of the signal amplifying element T2 is about the negative source potential, the thin film semiconductor device for signal amplification turns to an off state, so that the electric conductivity of the signal amplifying element T2 is reduced. When the gate potential of the signal amplifying element T2 is about the positive source potential, the thin film semiconductor device for signal amplification turns to an on state, so that the electric conductivity of the signal amplifying element T2 increases. Therefore, by measuring the variation of electric conductivity through the output line as described above, it is possible to obtain the unevenness information on the surface of a target.

The first electrode 51 of the reference capacitor 5 is connected to the column line C, and the second electrode 53 thereof is connected to the capacitance detecting electrode 41 and the gate electrode of the signal amplifying element T2, which is the thin film semiconductor device for signal amplification. As described above, in FIG. 2, since the high potential is applied to the column line C in a state in which the column line C is selected, the high potential ($V_{dd}$) is also applied to the first electrode 51 of the reference capacitor 5 connected to the column line C, and the potential corresponding to the capacitance of a target is applied to the gate electrode of the signal amplifying element T2. Then, the electric conductivity between the source and drain of the thin film semiconductor device for signal amplification varies, and the variation is detected, thereby obtaining the unevenness information on the surface of a target, for example, fingerprint information.

Figure 3:
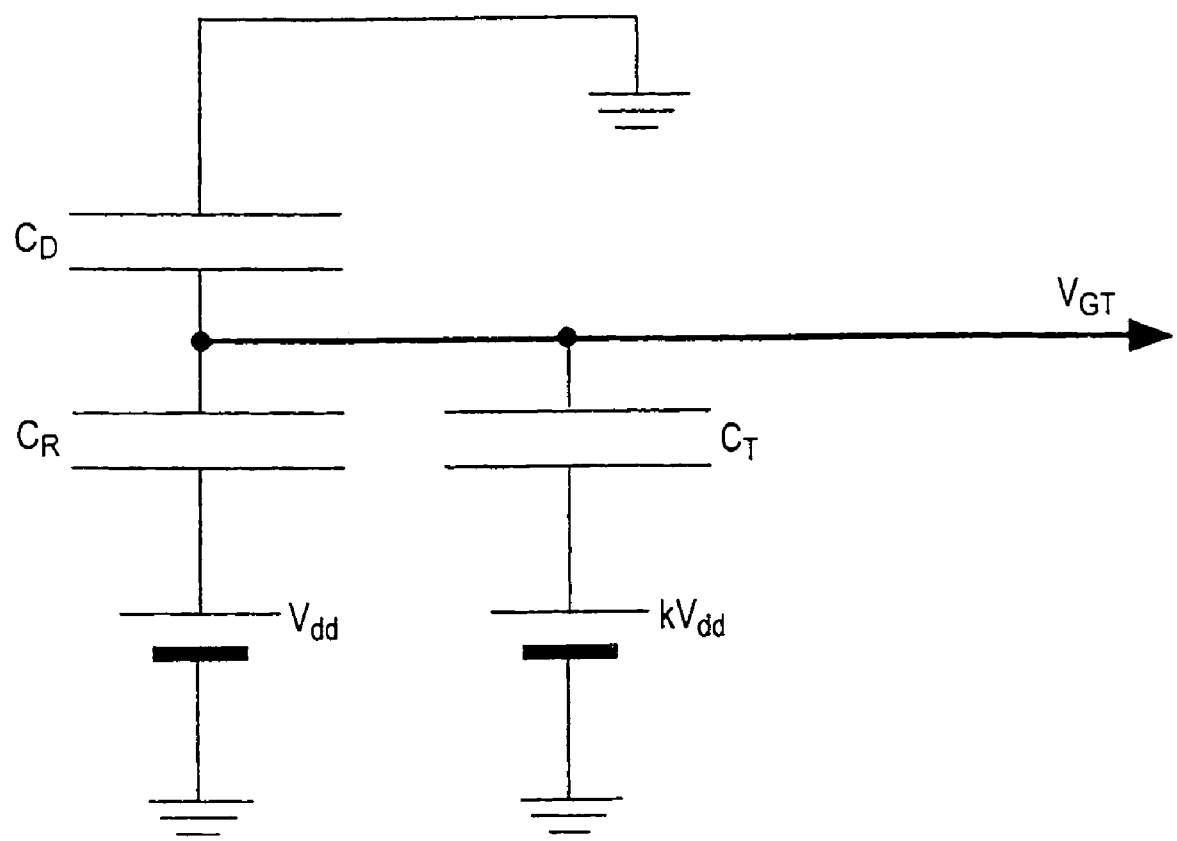
FIG. 3 is a schematic illustrating the principle of the first exemplary embodiment of the present invention.

In the above-mentioned structure, in order for the thin film semiconductor device (T2) for signal amplification of the present exemplary embodiment to effectively amplify signals, the transistor capacitance $C_T$ of the thin film semiconductor device for signal amplification, the reference capacitor capacitance $C_R$, and the element capacitance $C_D$ of the signal detecting element (4 or 5) must be appropriately set. The relationship therebetween will be explained below with reference to FIGS. 3 and 4.

First, a situation will be considered in which a convex portion of a target to be measured touches the capacitance detecting dielectric film 42, and the target is electrically connected to the ground. Specifically, a situation is assumed in which a capacitance detecting device is used as a fingerprint sensor, and the ridges of a fingerprint that is in contact with the surface of the capacitance detecting device are detected. The reference capacitor capacitance $C_R$ and the transistor capacitance $C_T$ of the thin film semiconductor device (T2) for signal amplification are respectively defined by the following expressions:

$$C_R = \epsilon_0 \cdot \epsilon_R \cdot S_R / t_R$$

$$C_T = \epsilon_0 \cdot \epsilon_{ox} \cdot S_T / t_{ox}$$

where $\epsilon_0$ is a dielectric constant in vacuum, $S_R$ (μm$^2$) is an electrode area of the reference capacitor 5, $t_R$ (μm) is a thickness of the reference capacitor dielectric film 52, $\epsilon_R$ is a relative dielectric constant of the reference capacitor dielectric film 52, $S_T$ (μm$^2$) is an area of the gate electrode of the thin film semiconductor device (T2) for signal amplification, $t_{ox}$ (μm) is a thickness of the gate insulating film, and $\epsilon_{ox}$ is a relative dielectric constant of the gate insulating film. Moreover, the element capacitance $C_D$ of the signal detecting element (4 or 5) is defined by the following expression:

$$C_D = \epsilon_0 \cdot \epsilon_D \cdot S_D / t_D$$

where $\epsilon_0$ is a dielectric constant in vacuum, $S_D$ (μm$^2$) is the area of the capacitance detecting electrode 41, $t_D$ (μm) is the thickness of the capacitance detecting dielectric film 42, and $\epsilon_D$ is a relative dielectric constant of the capacitance detecting dielectric film 42. The surface of the target serves as the ground electrode of the element capacitance $C_D$, and the capacitance detecting electrode 41 corresponds to the other electrode. The capacitance detecting dielectric film 42 is interposed between the two electrodes. Since the capacitance detecting electrode 41 is connected to the gate electrode of the thin film semiconductor device (T2) for signal amplification and the second electrode 53 of the reference capacitor 5, the capacitor having the element capacitance $C_D$ and the capacitor having the transistor capacitance $C_T$ are connected to each other in series. At the same time, the capacitor having the element capacitance $C_D$ is also connected in series to the capacitor having the reference capacitor capacitance $C_R$. The first electrode 51 of the reference capacitor 5 is connected to the column line C, and the high potential ($V_{dd}$) is applied when the column line C is selected. When a positive power source is used as a source voltage, specifically, when the ground potential is supplied to the power line P such that the output line O has the high potential ($V_{dd}$), the signal amplifying element T2 is connected in series to the column selecting element T3 and the row selecting element T4 between the power line P and the output line O. Therefore, the gate potential of the thin film semiconductor device for signal amplification when the column line C is selected is k times the potential $V_{dd}$ ($0 < k \leq 1$) (in FIG. 3). The value of k is determined by a resistance value of the column selecting element T3, a resistance value of the row selecting element T4, and a resistance value of the signal amplifying element T2. Specifically, the value of k is more than zero and 1 or less. When neither the column selecting element T3 nor the row selecting element T4 is provided, the value of k is 1. Since the voltage applied to the column line C and the drain electrode of the signal amplifying element T2 are divided corresponding to the capacitances of the three capacitors, the voltage (the gate voltage when a convex portion is brought into contact therewith) $V_{GT}$ applied to the gate electrode of the thin film semiconductor device (T2) for signal amplification in this state is as follows:

$$V_{GT} = \frac{kC_T + C_R}{C_D + C_T + C_R} \cdot V_{dd} \qquad \text{Equation 1}$$

Therefore, when the element capacitance $C_D$ is sufficiently larger than the sum of the reference capacitor capacitance $C_R$ and the transistor capacitance $C_T$, that is, $C_R + C_T$, as in Equation 2, $$C_D \gg C_T + C_R \qquad \text{Equation 2}$$

the gate voltage $V_{GT}$ approximates to zero as in Equation 3, and thus almost no voltage is applied to the gate electrode.

$$V_{GT} \approx 0 \qquad \text{Equation 3}$$

As a result, the thin film semiconductor device for signal amplification turns to the off state, so that a current I is extremely small. Ultimately, in order that almost no current passes through the signal amplifying element when the convex portion of a target, corresponding to the ridge of a fingerprint, contacts the capacitance detecting device, the area of the gate electrode (the length or width of the gate electrode), the material of the gate insulating film, the thickness of the gate insulating film, the electrode area of the reference capacitor (the length or width of the capacitor electrode), the material of the reference capacitor dielectric film, the thickness of the reference capacitor dielectric film, the area of the capacitance detecting electrode, the material of the capacitance detecting dielectric film, and the thickness of the capacitance detecting dielectric film that constitute the capacitance detecting element must be appropriately set such that the element capacitance $C_D$ is sufficiently larger than the sum of the reference capacitor capacitance $C_R$ and the transistor capacitance $C_T$, that is, $C_R + C_T$. In general, the term "sufficiently larger" means a difference in the magnitude of about 10 times or greater. The element capacitance $C_D$, the sum of the reference capacitor capacitance $C_R$ and the transistor capacitance $C_T$, that is, $C_R + C_T$, should satisfy the following relationship:

$$C_D > 10 \times (C_R + C_T)$$

In this case, $V_{GT}/V_{dd}$ is approximately 0.1 or less, and the thin film semiconductor device cannot turn to the on state. In order to accurately detect the convex portion of a target, it is important that the thin film semiconductor device for signal amplification be in the off state when the convex portion of the target contacts the capacitance detecting device. Therefore, if a source voltage is the high potential ($V_{dd}$), an N-type enhancement mode transistor (a normally off type) in which a drain current does not flow at a gate voltage near zero is preferably used as the thin film semiconductor device for signal amplification. More ideal is to use an N-type MIS thin film semiconductor device for signal amplification in which the minimum gate voltage satisfies the following relationships:

$$0 < 0.1 \times V_{dd} < V_{min}, \text{ or}$$

$$0 < V_{GT} < V_{min}$$

where $V_{min}$ is a gate voltage (the minimum gate voltage) at which the drain current becomes the minimum value in transfer characteristics.

If the source voltage is the low potential ($V_{ss}$) and the ground potential is supplied as the high potential ($V_{dd}$), a P-type enhancement mode transistor (a normally off type) in which a drain current does not flow at a gate voltage near zero is used as the thin film semiconductor device for signal amplification. More ideal is to use a P-type MIS thin film semiconductor device for signal amplification whose minimum gate voltage $V_{min}$ satisfies the following relationships:

$$V_{min} < 0.1 \times V_{ss} < 0, \text{ or}$$

$$V_{min} < V_{GT} < 0$$

These relationships enable the convex portion of the target to be accurately detected under the situation where the current value I is extremely small.

Figure 4:
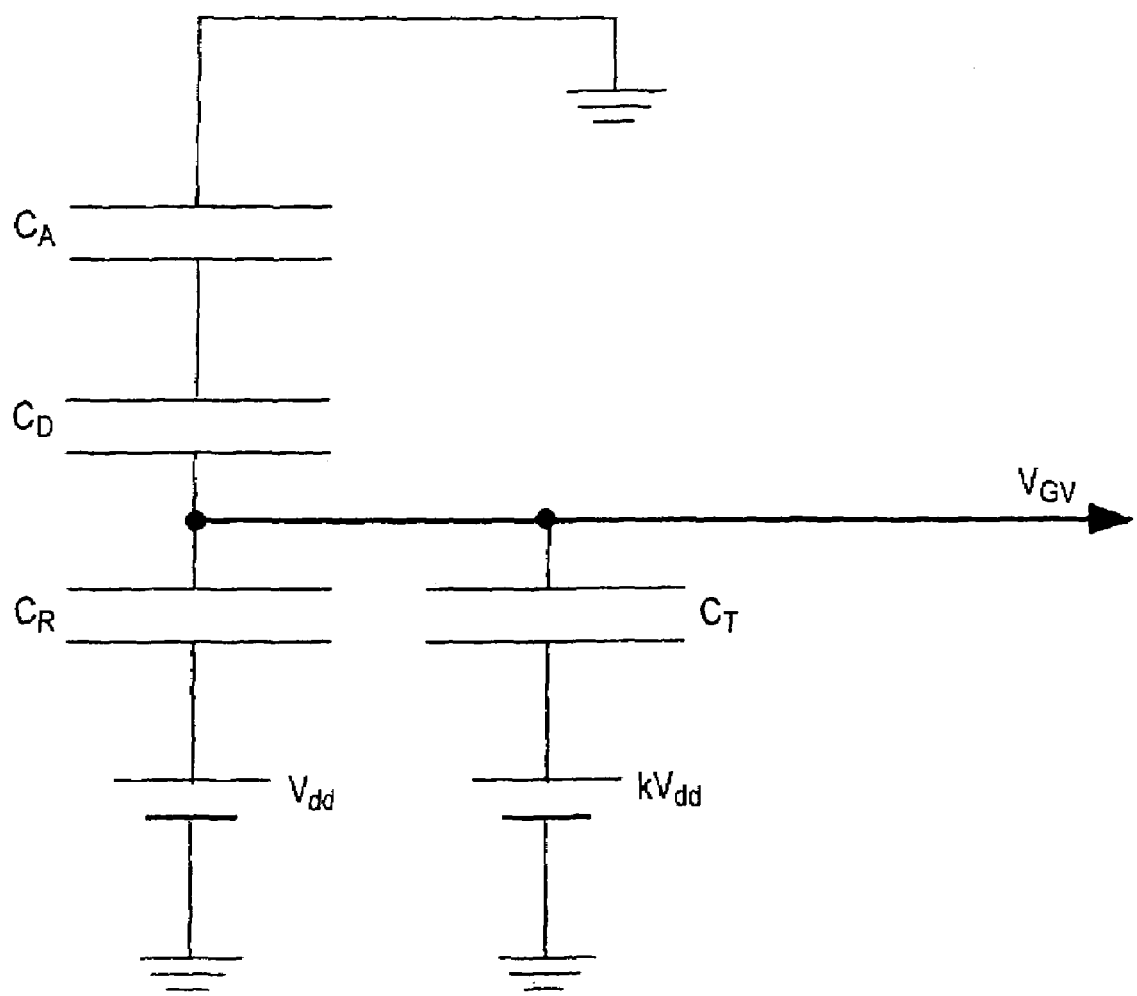
FIG. 4 is a second schematic illustrating the principle of the first exemplary embodiment of the present invention.

Next, a situation is considered in which a target does not come into contact with the capacitance detecting dielectric film, but is separated therefrom by a target distance $t_A$. A concave portion of the target to be measured is located above the capacitance detecting dielectric film, and the target is also electrically connected to the ground. Specifically, it is assumed that the valley of a fingerprint approaching the surface of the capacitance detecting device is detected when the capacitance detecting device is used as a fingerprint sensor. As described above, in the capacitance detecting device of an exemplary aspect of the present invention, the capacitance detecting dielectric film may be located on the uppermost surface of the capacitance detecting device. A schematic of this case is shown in FIG. 4. Since the surface of the target does not come into contact with the capacitance detecting dielectric film, an additional capacitor with air as a dielectric substance is formed between the capacitance detecting dielectric film and the surface of the target. This is called a target capacitance $C_A$, and is defined as follows:

$$C_A = \epsilon_0 \cdot \epsilon_A \cdot S_D / t_A$$

where $\epsilon_0$ is a dielectric constant in vacuum, $\epsilon_A$ is a relative dielectric constant in air, and $S_D$ is the area of the capacitance detecting electrode. As such, in a state in which the target is separated from the capacitance detecting dielectric film, the element capacitance $C_D$ and the target capacitance $C_A$ are connected to each other in series, and the transistor capacitance $C_T$ and the reference capacitor capacitance $C_R$ connected in parallel to those capacitors are connected to each other in series. The voltage $V_{dd}$ is applied to the reference capacitor, and a voltage $kV_{dd}$ is applied to the drain electrode of the signal amplifying element (FIG. 4). The applied voltage is divided by the capacitances of the four capacitors. Therefore, a voltage $V_{GV}$ (the gate voltage when the valley of a fingerprint approaches) applied to the gate electrode of the thin film semiconductor device for signal amplification under such a condition is expressed by the following Equation 4.

$$V_{GV} = \frac{kC_T + C_R}{\frac{C_A C_D}{C_A + C_D} + C_T + C_R} \cdot V_{dd} \quad \text{Equation 4}$$

In an exemplary aspect of the present invention, the capacitance detecting element is formed such that the drain current is extremely small when the target comes into contact with the capacitance detecting device, so that the condition $C_D \gg C_T + C_R$ (Equation 2) is satisfied. Therefore, the voltage $V_{GV}$ approximates to the following Equation 5:

$$V_{GV} \approx \frac{V_{dd}}{\frac{C_T + C_R}{kC_T + C_R} + \frac{C_A}{kC_T + C_R}} \quad \text{Equation 5}$$

Herein, if the reference capacitor capacitance $C_R$ is sufficiently larger than the target capacitance $C_A$ as in Equation 6, $$C_R \gg C_A \quad \text{Equation 6}$$

the gate voltage $V_{GV}$ is simply expressed by Equation 7.

$$V_{GV} \approx \frac{kC_T + C_R}{C_T + C_R} \cdot V_{dd} \quad \text{Equation 7}$$

As such, when the value of k approximates to 1, the gate voltage $V_{GV}$ is substantially equal to the source voltage $V_{dd}$. When the reference capacitor capacitance $C_R$ is sufficiently larger than the transistor capacitance $C_T$ as in the following Equation 8, $$C_R \gg C_T \quad \text{Equation 8}$$

the gate voltage $V_{GV}$ is substantially equal to the source voltage $V_{dd}$ regardless of the magnitude of the value of K as in the following Equation 9.

$$V_{GV} \approx V_{dd} \quad \text{Equation 9}$$

As a result, the thin film semiconductor device for signal amplification can turn to the on state, and an extremely large current I is obtained. In order for a large amount of current to pass through the signal amplifying element when a concave portion of a target, corresponding to the valley of a fingerprint, is present over the capacitance detecting device, it is necessary that the reference capacitor capacitance $C_R$ be sufficiently larger than the target capacitance $C_A$. As described above, since a difference in magnitude of about 10 times is generally considered "sufficiently larger," the reference capacitor capacitance $C_R$ and the target capacitance $C_A$ may satisfy the following relationship:

$$C_R > 10 \times C_A$$

In order to allow the transistor to be the on state regardless of the value of k when the valley of a fingerprint approaches, the reference capacitor capacitance $C_R$ may be ten times or more larger than the transistor capacitance $C_T$ as in the following expression:

$$C_R > 10 \times C_T$$

When the above-mentioned relationships are satisfied, $V_{GV}/V_{dd}$ is approximately 0.9 or greater. Thus, the thin film semiconductor device easily turns to the on state. In order to accurately detect the concave portion of a target, it is important that the thin film semiconductor device for signal amplification be in the on state when the concave portion of the target approaches the capacitance detecting device. If a positive power source is used for a source voltage $V_{dd}$, an N-type enhancement mode transistor (a normally off type) is used as the thin film semiconductor device for signal amplification, and a threshold voltage $V_{th}$ of the transistor may be smaller than the voltage $V_{GV}$. More ideal is to use an N-type MIS thin film semiconductor device for signal amplification satisfying the following relationship:

$$0 < V_{th} < 0.91 \times V_{dd}$$

On the contrary, if a negative power source is used for the source voltage $V_{ss}$, a P-type enhancement mode transistor (a normally off type) is used as the thin film semiconductor device for signal amplification. Ideally, the threshold voltage $V_{th}$ of the P-type thin film semiconductor device for signal amplification may be larger than the voltage $V_{GV}$. More ideal is to use a P-type MIS thin film semiconductor device for signal amplification satisfying the following relationship:

$$0.91 \times V_{ss} < V_{th} < 0$$

In this way, the concave portions of the target can be accurately detected under the situation in which the current value I is extremely large.

Ultimately, the correct recognition of the unevenness of the target is performed in such a way that the signal amplifying element passes almost no current when a convex portion of a target, corresponding to the ridge of a fingerprint, comes into contact with the capacitance detecting device, and that the signal amplifying element passes a large amount of current when a concave portion of the target, corresponding to the valley of a fingerprint, is over the capacitance detecting device. Therefore, in order to achieve the correct recognition of the unevenness of the target, it is necessary that the capacitance detecting dielectric film in the capacitance detecting element be positioned on the uppermost surface of the capacitance detecting device, and that the gate electrode area $S_T$ ($\mu m^2$), the thickness $t_{ox}$ ($\mu m$) of the gate insulating film, a relative dielectric constant $\in_{ox}$ of the gate insulating film of the thin film semiconductor device for signal amplification, the electrode area $S_R$ ($\mu m^2$) of the reference capacitor, the thickness $t_R$ ($\mu m$) of the reference capacitor dielectric film, a relative dielectric constant $\in_R$ of the reference capacitor dielectric film, the area $S_D$ ($\mu m^2$) of the capacitance detecting electrode, the thickness $t_D$ ($\mu m$) of the capacitance detecting dielectric film, and a relative dielectric constant $\in_D$ of the capacitance detecting dielectric film all be appropriately set such that the element capacitance $C_D$ is sufficiently larger than the sum of the reference capacitor capacitance $C_R$ and the transistor capacitance $C_T$, that is, $C_R+C_T$. Furthermore, it is necessary that the capacitance detecting device be configured such that the reference capacitor capacitance $C_R$ is sufficiently larger than the target capacitance $C_A$ when the target does not come into contact with the capacitance detecting dielectric film, but is separated therefrom by the target distance $t_A$. Ideally, the reference capacitor capacitance $C_R$ must be sufficiently larger than the transistor capacitance $C_T$. Specifically, the reference capacitor capacitance $C_R$ and the transistor capacitance $C_T$ satisfy the following relationship:

$$C_R>10\times C_T$$

The capacitance detecting device may be configured such the element capacitance $C_D$, the reference capacitor capacitance $C_R$, and the target capacitance $C_A$ satisfy the following relationships:

$$C_D>10\times C_R$$

$$C_R>10\times C_A$$

Further, if the high potential ($V_{dd}$) is used for the source voltage, an N-type enhancement mode transistor (a normally off type) may be used as the thin film semiconductor device for signal amplification. It is ideal to use an N-type enhancement mode transistor whose minimum gate voltage $V_{min}$ satisfies the following relationship:

$$0<0.1\times V_{dd}<V_{min} \text{ or } 0<V_{GT}<V_{min}$$

and whose threshold voltage $V_{th}$ is smaller than the $V_{GV}$, and specifically, satisfies the following relationship:

$$0<V_{th}<0.91\times V_{dd} \text{ or } 0<V_{th}<V_{GV}$$

If a negative power source ($V_{ss}$) is used for the source voltage, a P-type enhancement mode transistor (a normally off type) may be used as the thin film semiconductor device for signal amplification. It is ideal to use a P-type enhancement mode transistor whose minimum gate voltage $V_{min}$ satisfies the following relationship:

$$V_{min}<0.1\times V_{ss}<0 \text{ or } V_{min}<V_{GT}<0$$

and whose threshold voltage $V_{th}$ is larger than the $V_{GV}$, and specifically, satisfies the following relationship:

$$0.91\times V_{ss}<V_{th}<0 \text{ or } V_{GV}<V_{th}<0$$

The structure of the capacitance detecting element according to the present exemplary embodiment will now be described with reference to FIG. 5. The thin film semiconductor device for signal amplification constituting the signal amplifying element T2 of the capacitance detecting element 1 includes a semiconductor film 110 having a source region, a channel forming region, and a drain region, a gate insulating film 120, and a gate electrode 170 as indispensable components. Similarly, the thin film semiconductor device for column selection constituting the column selecting element T3 also includes a semiconductor film 110 having a source region, a channel forming region, and a drain region, a gate insulating film 120, and a gate electrode 170 as indispensable components. Further, the thin film semiconductor device for row selection constituting the row selecting element T4 includes a semiconductor film 110 having a source region, a channel forming region, and a drain region, a gate insulating film 120, and a gate electrode 170 as indispensable components. In the structure shown in FIG. 5, the thin film semiconductor device (T2) for signal amplification, the column selecting element T3, and the row selecting element T4 are respectively formed by an NMOS. Although not shown in FIG. 5, the first electrode of the reference capacitor is composed of an N-type semiconductor film, which is the same material as the drain region of the thin film semiconductor device (T2) for signal amplification. Both the first electrode of the reference capacitor and the drain electrode of the thin film semiconductor device are formed on the same base protective film. The dielectric film of the reference capacitor is composed of a silicon oxide film, which is the same material as the gate insulating film 120 (which is indicated by "G1" in FIG. 5) of the thin film semiconductor device for signal amplification, and they are formed on the same layer (on the semiconductor layer). The second electrode of the reference capacitor is composed of a metal film (specifically, a tantalum thin film), which is the same material as the gate electrode 170 of the thin film semiconductor device for signal amplification (T2).

The capacitance detecting element 1 can be formed on a plastic substrate 100 using the above-mentioned SUFTLA technique. A fingerprint sensor based on a monocrystalline silicon technique has no practical use because it vertically splits on plastic or it is not formed in a sufficiently large size. However, the capacitance detecting element formed on the plastic substrate 100 according to an exemplary aspect of the present invention can be suitable for a fingerprint sensor on the plastic substrate 100 since there is no fear that the capacitance detecting element 1 will split even when it has a sufficiently large area to cover a finger. Specifically, a smart card having a personal certification function can be realized by the present invention. The smart card having the personal identification function is used in cash cards (bank cards), credit cards, and identity cards, and has the superior feature of not only markedly enhancing the security level of these cards, but also of protecting personal fingerprint information from being released outside the card.

EXAMPLE 1

A capacitance detecting device composed of thin film semiconductor devices is fabricated on a glass substrate. The fabricated capacitance detecting device is then transferred to a plastic substrate using the SUFTLA technique, thereby forming a capacitance detecting device on a plastic substrate. The capacitance detecting device includes capacitance detecting elements aligned in a matrix of 304 rows and 304 columns. The matrix is formed in a square shape having a diagonal measurement of 20 mm.

The substrate made of poly-ether-sulfone (PES) has a thickness of 200 µm. The signal amplifying element, the row selecting element, the column selecting element, and the reset element are respectively formed of an N-type thin film semiconductor device. The thin film transistors are a top-gate type as shown in FIG. 5, and are fabricated in a low-temperature process where the maximum process temperature is 425° C. The gate electrode lengths L of the thin film semiconductor device for column selection, and the thin film semiconductor device for row selection are 3 µm. The gate electrode widths W thereof are 5 µm. The gate electrode length L of the thin film semiconductor device for signal amplification and the thin film semiconductor device for reset are set to 2 µm, and the gate electrode width W thereof are set to 2 µm. The semiconductor film is a polycrystalline silicon thin film achieved through laser crystallization and has a thickness of 50 nm. In addition, the gate insulating film is a silicon oxide film having a thickness of 45 nm that is formed by a chemical vapor deposition (CVD) method. The gate electrode is composed of a tantalum thin film having a thickness of 400 nm. The relative dielectric constant of the silicon oxide film constituting the gate insulating film is found to be approximately 3.9 according to CV measurement. The first electrode of the reference capacitor is formed of an N-type semiconductor film that is the same as the drain region of the thin film semiconductor device for signal amplification, and the dielectric film of the reference capacitor is formed of a silicon oxide film that is the same as the gate insulating film of the thin film semiconductor device for signal amplification. The second electrode of the reference capacitor is formed of a tantalum thin film that is the same as the gate electrode of the thin film semiconductor device for signal amplification. The first electrode of the reference capacitor is connected to the row line through a contact hole, and the second electrode thereof is connected to the capacitance detecting electrode and the gate electrode of the N-type thin film semiconductor device for signal amplification. The circuit structure of the capacitance detecting element is the same as that in FIG. 2. The gate electrode of the reset element in the capacitance detecting element positioned in the j-th column is connected to the (j+1)-th column line that is selected immediately before the j-th column line, and is common to the gate electrode of the thin film semiconductor device for column selection in the capacitance detecting element that is positioned in the (j+1)-th column. The source electrode of the reset element is connected to the power line having the ground potential, and the drain electrode thereof is connected to the capacitance detecting electrode, the gate electrode of the thin film semiconductor device for signal amplification, and the second electrode of the reference capacitor.

In this exemplary embodiment, the pitch of the rows and columns that form the capacitance detecting device is 66 μm, and the resolution is 385 dpi (dots per inch). Therefore, the area of the capacitance detecting electrode is 1529 μm². The capacitance detecting dielectric film is formed of a silicon nitride film having a thickness of 300 nm. Since CV measurement shows the relative dielectric constant of the silicon nitride film to be approximately 7.5, the element capacitance $C_D$ is approximately 338 fF (femtofarad). Assuming that the capacitance detecting device of the present exemplary embodiment is a fingerprint sensor, the target capacitance $C_A$ when the valley of a fingerprint is present over the surface of the capacitance detecting device is calculated to be 0.27 fF since the difference in height between the ridge and valley of a fingerprint is approximately 50 μm. Because the gate electrode length L of the MIS thin film semiconductor device for signal amplification is set to 2 μm and the gate electrode width W thereof is set to 2 μm, the transistor capacitance $C_T$ is approximately 3.07 fF. The electrode area $S_R$ of the reference capacitor is 42 μm². As a result, the reference capacitor capacitance $C_R$ is 32 fF. Thus, the capacitance detecting element described in this embodiment satisfies the following relationship:

$$C_D > 10 \times C_R$$

$$C_R > 10 \times C_T$$

$$C_R > 10 \times C_A$$

Thus, if the source voltage $V_{dd}$ is 3.3V, the voltage $V_{GT}$ applied to the gate electrode of the MIS thin film semiconductor device for signal amplification when the ridge of a fingerprint touches the surface of the capacitance detecting device is 0.30 V; and the voltage $V_{GV}$ applied to this gate electrode when the valley of the fingerprint is over the surface is 3.11 V. Since the minimum gate voltage $V_{min}$ of the N-type thin film semiconductor device for signal amplification used in the present exemplary embodiment is 0.35 V, and is larger than 0.30 V, which is the gate voltage $V_{GT}$ at the time of the contact of the ridge of a fingerprint, the N-type thin film semiconductor device for signal amplification completely turns to the off state. On the other side, since the threshold voltage $V_{th}$ is 1.42 V, and is smaller than 3.11 V, which is the gate voltage $V_{GV}$ obtained when the valley of the fingerprint approaches, the N-type thin film semiconductor device for signal amplification completely turns to the on state. As a result, the current value output from the signal amplifying element when the ridge of a fingerprint contacts the surface of the capacitance detecting device is $4.5 \times 10^{-13}$ A, which is extremely small. On the contrary, a large current of $2.6 \times 10^{-5}$ A is output from the signal amplifying element when the valley of the fingerprint approaches, thereby accurately detecting the unevenness information of a fingerprint and the like.

As described above, according to the first exemplary embodiment, it is possible to manufacture a capacitance detecting element capable of high-accuracy detection by using thin film semiconductor devices.

Particularly, exemplary aspects of the present invention has the following effects by including the reset element.

1) The reset element enables the accurate detection of capacitance when the potential of a node G, which is a measurement potential, is uniformly maintained before the read of capacitance.

2) In the first exemplary embodiment, since the power line has the ground potential, the reset potential is also the ground potential. Therefore, it is possible to set the voltage according to the variable capacitance $C_F$ of the capacitance detecting element to be zero. Therefore, even when the value of the variable capacitance $C_F$ varies due to the movement of a target before the read of capacitance, the voltage $V_G$ of the node G does not vary, thereby enhancing the accuracy of detection.

3) In the related art technique using a monocrystalline silicon substrate, a small capacitance detecting device having a size of several millimeters by several millimeters is formed on a plastic substrate. However, according to the present exemplary embodiment having the above-mentioned structure, a capacitance detecting device having an area about 100 times larger than the related art capacitance detecting device can be formed on a plastic substrate, and it is possible to detect the ridge and valley information of a target with higher accuracy. As a result, the present invention can be used, for example, to markedly enhance the security level of a smart card. In addition, the related art capacitance detecting device formed on a monocrystalline silicon substrate wastes a tremendous amount of energy and labor because only an extremely small portion of the device area actually uses the monocrystalline silicon semiconductor. In contrast to this, the present invention eliminates this kind of extravagant waste and has the effect of helping to conserve the global environment.

Second Exemplary Embodiment

The second exemplary embodiment of the present invention relates to an operation in which a predetermined potential, not the ground potential, is applied to the power line.

As described in the first exemplary embodiment, in the capacitance detecting element of an exemplary aspect of the present invention, the variation of capacitance between the capacitance detecting electrode 41 and a target is regarded as the variation of the voltage $V_G$ of the node to which the gate electrode of the signal amplifying element is connected, and the signal amplifying element amplifies the voltage $V_G$. Since the voltage between the gate and source of the signal amplifying element T2 does not depend on a supply voltage from the power line, the effects 1) and 3) of the first exemplary embodiment can be achieved without setting the supply potential of the power line to be the ground potential.

The circuit structure of a capacitance detecting device according to the second exemplary embodiment will be described with reference to FIG. 6. The circuit structure of the capacitance detecting device according to the second exemplary embodiment is completely the same as that in the first exemplary embodiment, except that the potential applied to the power line P is a predetermined potential $V_{PL}$, not the ground potential. That is, the capacitance detecting elements 1 are arranged in a matrix of M rows and N columns, and the power lines P are provided for supplying power to the respective capacitance detecting elements 1. A predetermined potential $V_{PL}$ is applied to the power line P. Similar to the first exemplary embodiment, the capacitance detecting elements 1 each include a signal detecting element (4 or 5) to store electric charge corresponding to the capacitance, a reset element T1 to reset the electric charge stored in the signal detecting element, and a signal amplifying element T2 to amplify the signal corresponding to the electric charge stored in the signal detecting element. The signal detecting element includes a capacitance detecting electrode 41, a capacitance detecting dielectric film 42 provided on the capacitance detecting electrode 41, and a reference capacitor 5. The reference capacitor 5 has a first electrode 51, a second electrode 53, and a dielectric film 52 provided between the first electrode 51 and the second electrode 53. The signal amplifying element T2 is a thin film semiconductor device for signal amplification having a source electrode, a drain electrode, and a gate electrode, and the reset element T1 is a thin film semiconductor device for reset having a source electrode, a drain electrode, and a gate electrode. The gate electrode of the signal amplifying element T2, the capacitance detecting electrode 41, the second electrode 53 of the reference capacitance, and the drain electrode of the reset element T1 are connected to each other, and this contact point is the node G, the potential of which is a measurement potential.

In the second exemplary embodiment, the signal amplifying element T2 is arranged between the power line P and the output line O, similar to the first exemplary embodiment. Specifically, the source electrode of the thin film semiconductor device for signal amplification, which is the signal amplifying element T2, is electrically connected to the power line P, and the drain electrode thereof is electrically connected to the output line O through the column selecting element T3 and the row selecting element T4. The meaning of the term "electrical connection" is the same as that in the first exemplary embodiment. The column selecting element T3 is composed of a thin film semiconductor device for column selection having a gate electrode, a gate insulating film, and a semiconductor film, and the row selecting element T4 is also composed of a thin film semiconductor device for row selection having a gate electrode, a gate insulating film, and a semiconductor film. The signal amplifying element T2, the column selecting element T3, and the row selecting element T4 are connected to each other in series. The gate electrode of the column selecting element T3 is connected to a column line C, and the gate electrode of the row selecting element T4 is connected to a row line R. In the second exemplary embodiment, since the column selecting element T3 and the row selecting element T4 are respectively formed of an N-type transistor, the low potential ($V_{ss}$) is applied to non-selected row lines, and the high potential ($V_{dd}$) is applied to a selected row line R (for example, an i-th row line).

Further, similar to the first exemplary embodiment, the column selecting element T3 and the row selecting element T4 are selection elements to select any capacitance detecting element from the capacitance detecting elements 1 arranged in a matrix while preventing information interference between rows and between columns, which are dispensable components. According to such a structure, by the same operation as that in the first exemplary embodiment, a column line and a row line are selected from the column lines C and the row lines R, respectively, which results in the selection of any one from the M×N capacitance detecting elements 1.

Since the reset element T1 and the column selecting element T3 perform an on/off switching operation with the same logic, the present exemplary embodiment is equal to the first exemplary embodiment in that the reset element T1 and the column selecting element T3 are formed of transistors of the same conductivity type, from the viewpoint of a simple circuit structure. Further, the present exemplary embodiment is equal to the first exemplary embodiment in that a P-type transistor is used for the reset element T1, the high potential ($V_{dd}$) is applied to the column lines C in a non-selected state, and the low potential ($V_{ss}$) is applied thereto in a selected state, thereby obtaining the same effects as those of the first exemplary embodiment.

Further, similar to the first exemplary embodiment, the reset element T1 and the signal amplifying element T2 may be formed of thin film semiconductor devices having the same conductivity type. In the first exemplary embodiment, since the source electrodes of the signal amplifying element T2 is supplied with the ground potential, which is the potential of the power line P, a current $I_{ds}$ flowing between the source and drain of the signal amplifying element T2 is modulated corresponding to the gate potential $V_G$ of the signal amplifying element T2. However, in the second exemplary embodiment, since the potential $V_{PL}$ of the power line P differs from the ground potential, a current $I_{ds}$ flowing between the source and drain of the signal amplifying element T2 is modulated corresponding to the voltage $V_{GS}=V_G-V_{PL}$ between the gate and source of signal amplifying element T2. During the reset period, since $V_G=V_{PL}$, the voltage $V_{GS}$ between the gate and source of signal amplifying element T2 is turned to zero. During the reading period, $V_G$ is varied according to the potential of the first electrode of the reference capacitor, the potential of the drain of signal amplifying element and the size of the target capacitance. When the voltage applied to the first electrode of reference capacitor varies $\Delta V_R$ in reading period with respect to the potential of first electrode of reference capacitor in reset period, and if $C_R \gg C_T$, $V_{GS}$ is proportional to $\Delta V_R$. So $V_{GS}$ is positive in the reading period when $\Delta V_R$ is positive, and $V_{GS}$ is negative in the reading period when $\Delta V_R$ is negative. Since the first electrode of reference capacitor is connected to column line C, when N-type transistors are used for the column selecting element T3 and reset element T1, a low potential ($V_{ss}$) is applied to non-selected column line C and a high potential ($V_{dd}$) is applied to selected column line C. Therefore $\Delta V_R$ and so $V_{GS}$ are positive in the reading period. In this case, N-type transistor, which can amplify the signal when $V_{GS}>0$, may be used for signal amplifying element T2. When P-type transistors are used for the column selecting element T3 and reset element T1, a high potential ($V_{dd}$) is applied to non-selected column line C and a low potential ($V_{ss}$) is applied to selected column line C. Therefore $\Delta V_R$ and so $V_{GS}$ are negative in the reading period. In this case, P-type transistor, which can amplify the signal when $V_{GS}$<0, may be used for signal amplifying element T2.

Next, the reset timing of the reset element T1 of an exemplary aspect of the present invention will be described with reference to FIG. 9. The description of the reset timing in the present exemplary embodiment is also applied to that in the first exemplary embodiment. In the capacitance detecting device of the present exemplary embodiment, at the timing shown in FIG. 9, a waveform is applied to allow the column line to be selected (active) that is, the high potential ($V_{dd}$) is applied. For the sake of convenience, a capacitance detecting element 1 that is switched to a selected state by allowing a row line R (for example, i) and a column line C (for example, j) to be a selected state so as to detect and read out capacitance is indicated by (i, j). For example, FIG. 6 shows a capacitance detecting element 1 (i, j+1) (the right side of FIG. 6) and a capacitance detecting element 1 (i, j) (the left side of FIG. 6).

Figure 9:
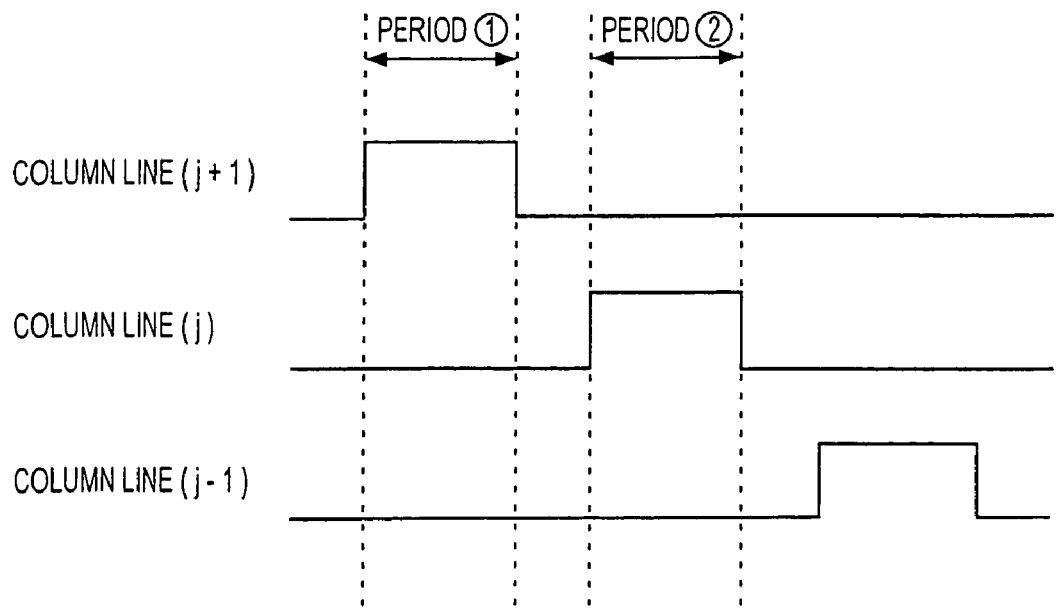
FIG. 9 is a timing chart for column selection in an exemplary embodiment of the present invention.

As shown in FIG. 9, a column line C (for example, j+1) is in the selected state during a period ①, and then a column line C (for example, j) is the selected state during a period ②. As such, waveforms are sequentially supplied to the respective column lines C such that the column line C having a lower number is in an active state. In the present exemplary embodiment, the gate electrode of the reset element T1 in each of the capacitance detecting elements 1 is connected to an adjacent column line that has previously been in the selected state. This structure makes it possible to reset the potential of the node G immediately before the detection of capacitance. For example, within the period ①, when a row line R (i) is selected in a state in which a column line C (j+1) has been in the selected state, a capacitance detecting element 1 (i, j+1) is selected, so that the period ① is a reading period. At this time, the capacitance detecting element 1 (i, j) is in a non-selected state. However, since the gate electrode of the reset element T1 in the capacitance detecting element 1 (i, j) in the non-selected state is connected to an adjacent column line C (j+1), ultimately, the period ① becomes a reset period by the capacitance detecting element 1 (i, j). In the reset period ①, the source electrode and drain electrode of the reset element T1 in the capacitance detecting element 1 (i, j) are electrically connected to each other, so that the potential $V_G$ of the node G is reset to the potential ($V_{PL}$ in the present exemplary embodiment, and the ground potential in the first exemplary embodiment) that is supplied to the power line P. Then, before the capacitance detecting element 1 (i, j) enters the reading period ②, the column line C (j+1) returns to the non-selected state. Therefore, the reset element T1 becomes a switch-off state, and the node G and the power line P are disconnected from each other. When the capacitance detecting element 1 (i, j) enters the reading period ②, the column line (j) is selected, and the signal corresponding to the electric charge stored in the capacitance detecting electrode 41 is amplified by the signal amplifying element T2, thereby measuring capacitance.

In the present exemplary embodiment, since a predetermined potential $V_{PL}$, not the ground potential, is supplied to the power line P contrary to the first exemplary embodiment, the analysis of voltage is a little different from that in the first exemplary embodiment. The reason will be described below.

Figure 7:
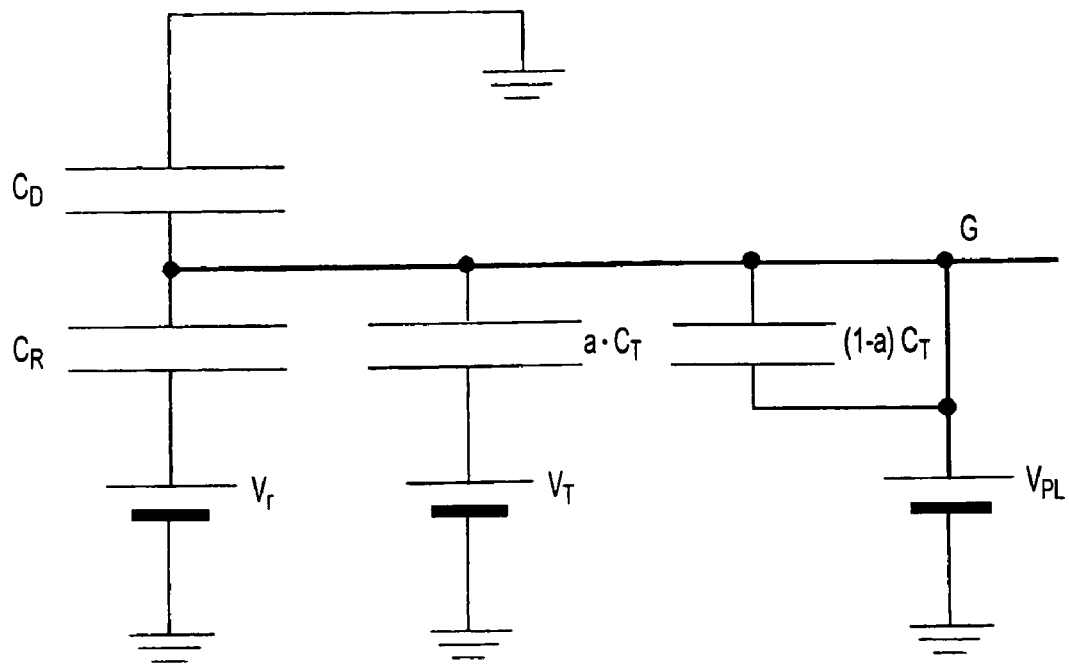
FIG. 7 is a schematic illustrating the principle of the second exemplary embodiment of the present invention (a reset period)
Figure 8:
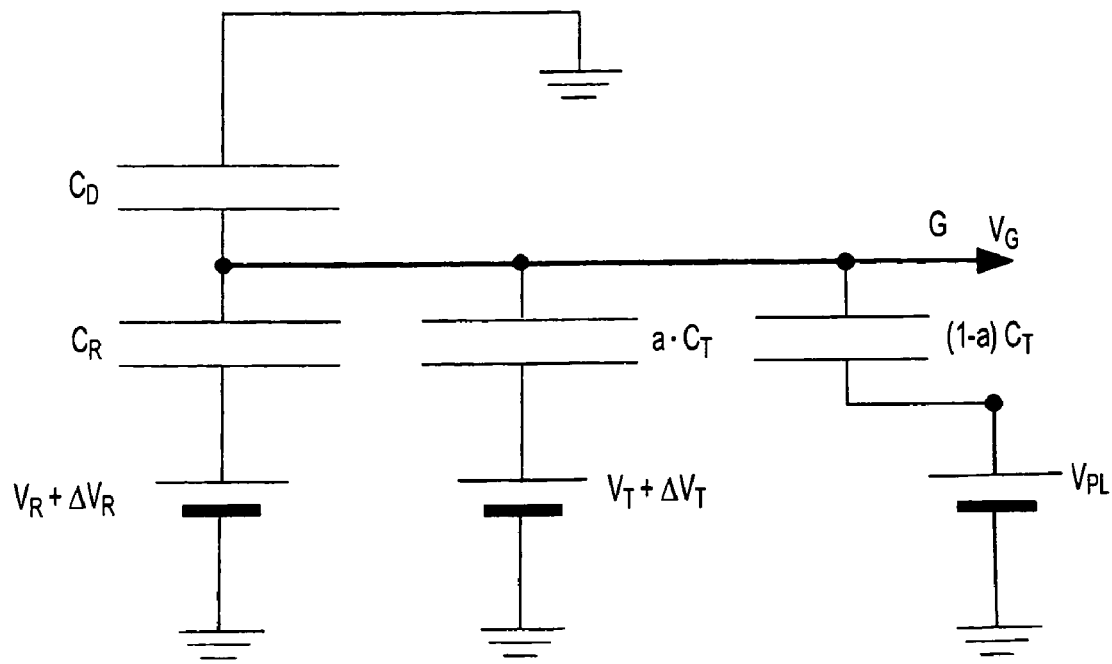
FIG. 8 is a schematic illustrating the principle of the second exemplary embodiment of the present invention (a reading period)

FIG. 7 is a schematic of the capacitance detecting element 1 (i, j) within the reset period ①, and FIG. 8 is a schematic of the capacitance detecting element 1 (i, j) within the reading period ②. In the reset period ①, the voltage $V_G$ of the node G of the capacitance detecting element 1 is reset to the supply voltage $V_{PL}$ of the power line P. Subsequently, in the reading period ②, when the voltage applied to the first electrode 51 of the reference capacitor varies by $\Delta V_R$, and the drain voltage of the signal amplifying element T2 varies by $\Delta V_T$ with respect to the voltage in reset period (FIG. 8), and when the drain capacitance of the thin film semiconductor device for signal amplification is "a·Ct" (0≦a≦1), the node voltage $V_G$ is expressed by the following Equation 10.

$$V_G = V_{PL} + \frac{C_R}{C_F + C_R + C_T} \cdot \Delta V_R + \frac{a \cdot C_T}{C_F + C_R + C_T} \cdot \Delta V_T \qquad \text{Equation 10}$$

On the other side, since a voltage applied to the source electrode of the signal amplifying element T2 is the voltage $V_{PL}$ of the power line P, the voltage $V_{GS}$ between the gate and source of the signal amplifying element T2 is expressed by the following Equation 11.

$$V_{GS} = \frac{C_R}{C_F + C_R + C_T} \cdot \Delta V_R + \frac{a \cdot C_T}{C_F + C_R + C_T} \cdot \Delta V_T \qquad \text{Equation 11}$$

Figure 6:
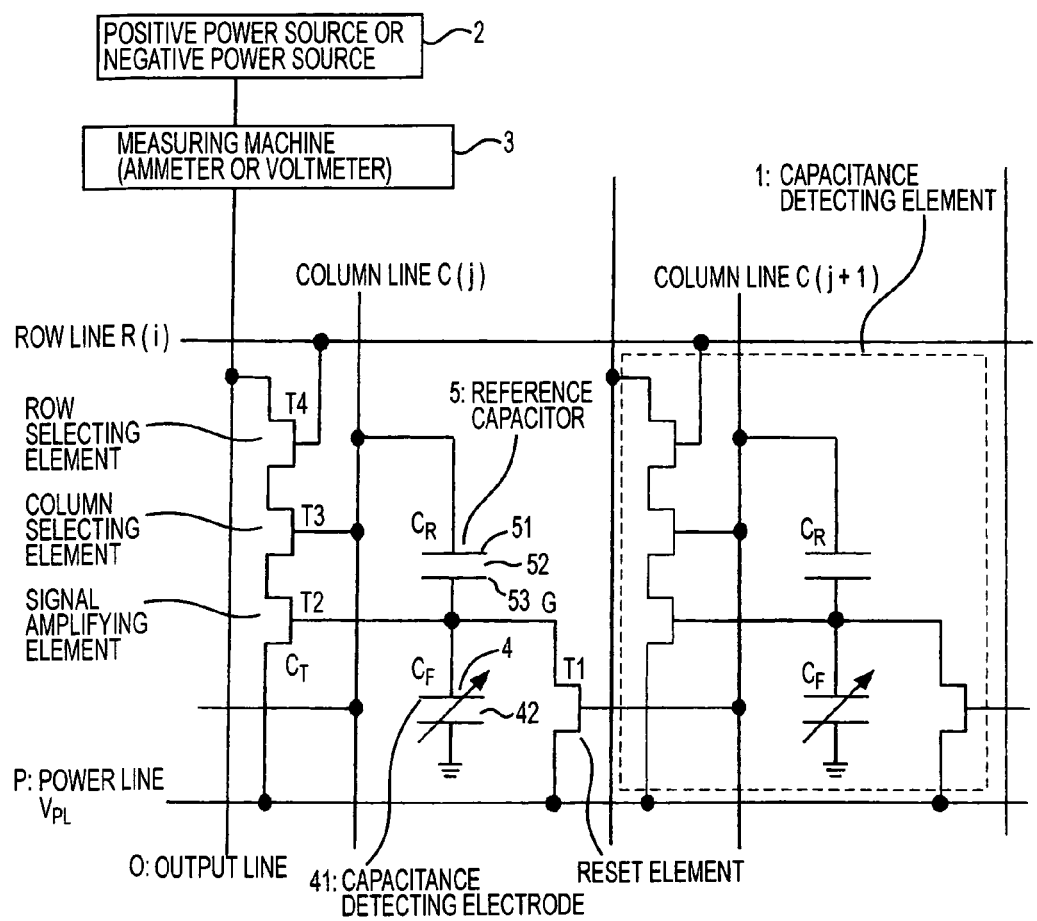
FIG. 6 is a schematic illustrating the circuit structure of a capacitance detecting element according to a second exemplary embodiment of the present invention.

In the circuit structure shown in FIG. 6, since the first electrode 51 of the reference capacitor 5 is connected to the column line C (j), $\Delta V_R = V_{dd}$. The signal amplifying element T2, the column selecting element T3, and the row selecting element T4 are connected to each other in series between the power line P and the output line O, and a difference in potential between the power line P and the output line O is generally less than $V_{dd}$ at the time of reading. Therefore, $\Delta V_T = b \cdot V_{dd}$ (0≦b≦1). When this relationship is substituted into Equation 10, the following Equation 12 is obtained.

$$V_G = V_{PL} + \frac{C_R + a \cdot b \cdot C_T}{C_F + C_R + C_T} \cdot V_{DD} \qquad \text{Equation 12}$$

Further, in Equation 12, when $V_{PL}$ is the ground potential, the following Equation 13 is obtained.

$$V_G = \frac{C_R + a \cdot b \cdot C_T}{C_F + C_R + C_T} \cdot V_{DD} \qquad \text{Equation 13}$$

When the ridge of a fingerprint touches the capacitance detecting dielectric film 42, $C_F = C_D$. Then, when the relationship is substituted into Equation 13, Equation 1 as in the first exemplary embodiment is induced. When the valley of the fingerprint is located over the capacitance detecting dielectric film 42 with air interposed therebetween, $C_F = C_D \cdot C_A/(C_D + C_A)$, Equation 4 in the first exemplary embodiment is induced. That is, Equation 11 is a general expression relating to the detection voltage of the capacitance detecting element 1 according to an exemplary aspect of the present invention, and it is confirmed that operating conditions equivalent to the first exemplary embodiment are obtained under a specific condition.

Since the second exemplary embodiment is completely equal to the first exemplary embodiment in circuit structure, except applying the voltage to the power line P, the effects and modifications made from the second exemplary embodiment can be the same as those in the first exemplary embodiment.

Figure 5:
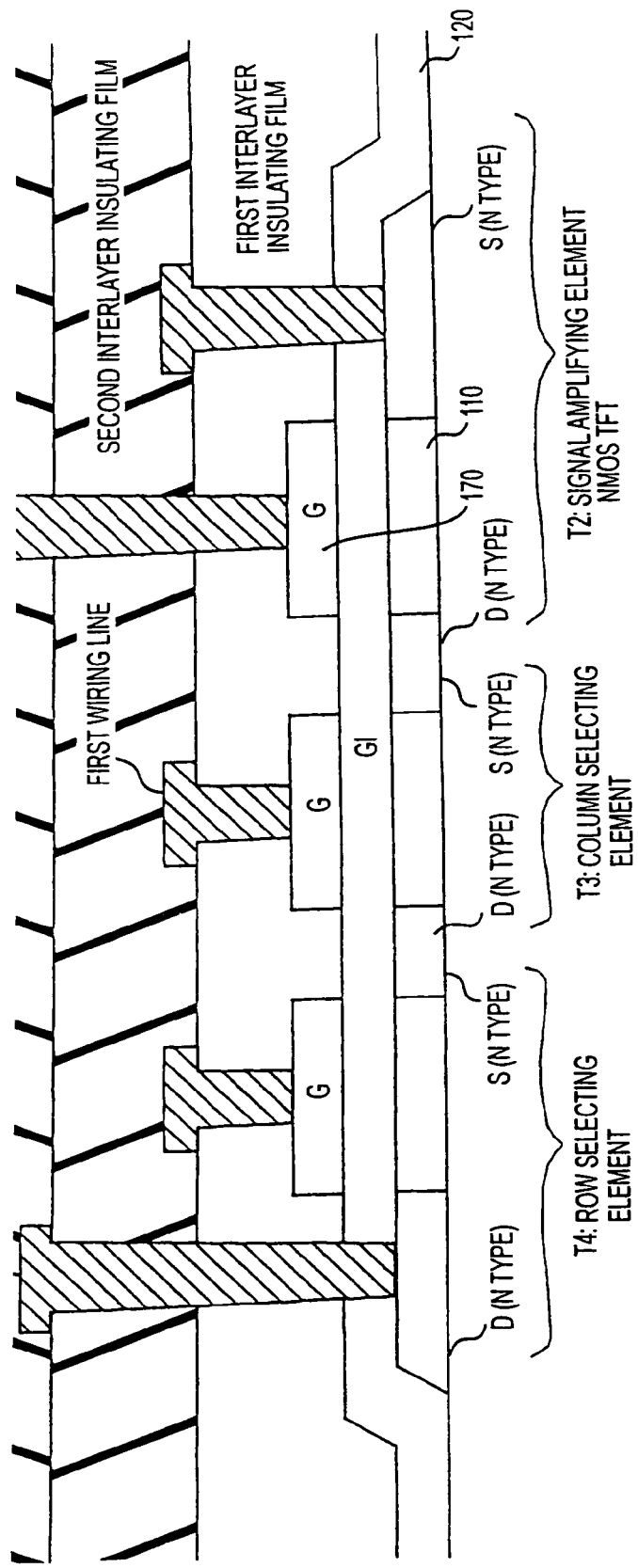
FIG. 5 is a schematic illustrating the structure of an element according to an exemplary embodiment of the present invention.

Further, the layer structure of the capacitance detecting element according to the second exemplary embodiment is the same as that in the first exemplary embodiment (see FIG. 5).

As described above, since the capacitance detecting device according to the second exemplary embodiment includes a reset element and a signal amplifying element, the second exemplary embodiment can also achieve the effects 1) and 3) of the first exemplary embodiment.

What is claimed is:

1. A capacitance detecting device that reads surface contours of a target by detecting capacitance which changes according to a distance from the target, comprising:
   capacitance detecting elements arranged in a matrix of M rows and N columns; and
   a power line to supply power to the respective capacitance detecting elements, each of the capacitance detecting elements having:
   a) a signal detecting element to store electric charge corresponding to the capacitance;
   b) a reset element to reset the electric charge stored in the signal detecting element; and
   c) a signal amplifying element to amplify a signal corresponding to the electric charge stored in the signal detecting element,
   the signal detecting element having a capacitance detecting electrode,
   the signal amplifying element being composed of a thin film semiconductor device for signal amplification having a source electrode, a drain electrode, and a gate electrode,
   the reset element being composed of a thin film semiconductor device for reset having a source electrode, a drain electrode, and a gate electrode, and
   the gate electrode of the signal amplifying element, the capacitance detecting electrode, and the drain electrode of the reset element being connected to each other,
   wherein the gate electrode of the reset element is connected to a column line adjacent to a column line in which the capacitance detecting element having the reset element is positioned.

2. The capacitance detecting device according to claim 1, when the reset element being in a switched-on state, the gate electrode of the signal amplifying element, the capacitance detecting electrode, and the power line being electrically connected to each other.

3. The capacitance detecting device according to claim 1, the source electrode of the reset element being connected to the power line.

4. The capacitance detecting device according to claim 1, when the capacitance detecting element is in a selected state, the source electrode of the thin film semiconductor device for signal amplification being electrically connected to the power line.

5. The capacitance detecting device according to claim 1, further comprising:
   output lines, when the capacitance detecting element is in the selected state, the drain electrode of the thin film semiconductor device for signal amplification being electrically connected to an output line.

6. The capacitance detecting device according to claim 1, the signal amplifying element and the reset element being thin film semiconductor devices having the same conductivity type.

7. A capacitance detecting device that reads surface contours of a target by detecting capacitance which changes according to a distance from the target, comprising:
   M row lines and N column lines arranged in a matrix of M rows and N columns;
   capacitance detecting elements arranged at intersections of the row lines and the column lines; and
   power lines,
   each of the capacitance detecting elements having a signal detecting element, a signal amplifying element; and a reset element,
   the signal detecting element having a capacitance detecting electrode and a capacitance detecting dielectric film,
   the signal amplifying element being composed of a thin film semiconductor device for signal amplification having a source electrode, a drain electrode, and a gate electrode,
   the reset element being composed of a thin film semiconductor device for reset having a source electrode, a drain electrode, and a gate electrode,
   a ground potential being applied to the power line, and
   the gate electrode of the signal amplifying element, the capacitance detecting electrode, and the drain electrode of the reset element being connected to each other,
   wherein the gate electrode of the reset element is connected to a column line adjacent to a column line in which the capacitance detecting element having the reset element is positioned.

8. A capacitance detecting device that reads surface contours of a target by detecting capacitance which changes according to a distance from the target, comprising:
   capacitance detecting elements arranged in a matrix of M rows and N columns; and
   a plurality of power lines to supply power to the respective capacitance detecting elements, each of the capacitance detecting elements having:
   a) a signal detecting element to store electric charge corresponding to the capacitance;
   b) a reset element to reset the electric charge stored in the signal detecting element; and
   c) a signal amplifying element to amplify a signal corresponding to the electric charge stored in the signal detecting element,
   the signal detecting element including:
   a1) a capacitance detecting electrode;
   a2) a capacitance detecting dielectric film provided on the capacitance detecting electrode; and
   a3) a reference capacitor, the reference capacitor having a first electrode, a second electrode, and a dielectric film provided between the first electrode and the second electrode,
   the signal amplifying element being composed of a thin film semiconductor device for signal amplification having a source electrode, a drain electrode, and a gate electrode, the reset element being composed of a thin film semiconductor device for reset having a source electrode, a drain electrode, and a gate electrode, and the gate electrode of the signal amplifying element, the capacitance detecting electrode, the second electrode of the reference capacitor, and the drain electrode of the reset element being connected to each other, wherein the first electrode of the reference capacitor and a column line are connected to each other.

9. The capacitance detecting device according to claim 8, when the reset element is in a switched-on state, the gate electrode of the signal amplifying element, the capacitance detecting electrode, and the second electrode of the reference capacitor being electrically connected to the power line.

10. The capacitance detecting device according to claim 8, when the reset element is in the switched-on state, the first and second electrodes of the reference capacitor having the same potential.

11. The capacitance detecting device according to claim 8, the source electrode of the reset element being connected to the power line.

12. The capacitance detecting device according to claim 8, when the capacitance detecting element is in a selected state, the source electrode of the thin film semiconductor device for signal amplification being electrically connected to the power line.

13. The capacitance detecting device according to claim 8, further comprising:

output lines, when the capacitance detecting element is in the selected state, the drain electrode of the thin film semiconductor device for signal amplification being electrically connected to an output line.

14. The capacitance detecting device according to claim 8, the signal amplifying element and the reset element being thin film semiconductor devices of the same conductivity type.

15. The capacitance detecting device according to claim 8, when a capacitance $C_R$ of the reference capacitor and a transistor capacitance $C_T$ of the thin film semiconductor device for signal amplification are defined by the following expressions:

$$C_R = \epsilon_0 \cdot \epsilon_R \cdot S_R / t_R$$

$$C_T = \epsilon_0 \cdot \epsilon_{ox} \cdot S_T / t_{ox}$$

where:

$\epsilon_0$ is a dielectric constant in vacuum;

$S_R$ (μm$^2$) is an electrode area of the reference capacitor;

$t_R$ (μm) is a thickness of the reference capacitor dielectric film;

$\epsilon_R$ is a relative dielectric constant of the dielectric film of the reference capacitor;

$S_T$ (μm$^2$) is an area of the gate electrode of the thin film semiconductor device for signal amplification;

$t_{ox}$ (μm) is a thickness of the gate insulating film; and $\epsilon_{ox}$ is a relative dielectric constant of the gate insulating film, and when a capacitance $C_D$ of the signal detecting element is defined by the following expression:

$$C_D = \epsilon_0 \cdot \epsilon_D \cdot S_D / t_D$$

where $\epsilon_0$ is a dielectric constant in vacuum;

$S_D$ (μm$^2$) is an area of the capacitance detecting electrode;

$t_D$ (μm) is a thickness of the capacitance detecting dielectric film; and $\epsilon_D$ is a relative dielectric constant of the capacitance detecting dielectric film, the element capacitance $C_D$ being sufficiently larger than the sum of the reference capacitor capacitance $C_R$ and the transistor capacitance $C_T$, that is, $C_R + C_T$.

16. The capacitance detecting device according to claim 15, the capacitance detecting dielectric film being positioned on an uppermost surface of the capacitance detecting device.

17. The capacitance detecting device according to claim 8, the target is not brought into contact with the capacitance detecting dielectric film, but is separated therefrom by a target distance $t_A$, and when a target capacitance $C_A$ is defined by the following equation:

$$C_A = \epsilon_0 \cdot \epsilon_A \cdot S_D / t_A$$

where $\epsilon_0$ is a dielectric constant in vacuum;

$\epsilon_A$ is a relative dielectric constant of air; and $S_D$ is an area of the capacitance detecting electrode, the reference capacitor capacitance $C_R$ being substantially larger than the target capacitance $C_A$.

18. The capacitance detecting device according to claim 8, the capacitance detecting dielectric film being positioned on the uppermost surface of the capacitance detecting device;

when a reference capacitor capacitance $C_R$ and a transistor capacitance $C_T$ of the thin film semiconductor device for signal amplification are defined by the following expressions:

$$C_R = \epsilon_0 \cdot \epsilon_R \cdot S_R / t_R$$

$$C_T = \epsilon_0 \cdot \epsilon_{ox} \cdot S_T / t_{ox}$$

where $\epsilon_0$ is a dielectric constant in vacuum;

$S_R$ (μm$^2$) is an electrode area of the reference capacitor;

$t_R$ (μm) is a thickness of the reference capacitor dielectric film;

$\epsilon_R$ is a relative dielectric constant of the reference capacitor dielectric film;

$S_T$ (μm$^2$) is an area of the gate electrode of the thin film semiconductor device for signal amplification;

$t_{ox}$ (μm) is a thickness of the gate insulating film; and $\epsilon_0$ is a relative dielectric constant of the gate insulating film, when an element capacitance $C_D$ of the signal detecting element is defined by the following expression:

$$C_D = \epsilon_0 \cdot \epsilon_D \cdot S_D / t_D$$

where $\epsilon_0$ is a dielectric constant in vacuum;

$S_D$ (μm$^2$) is an area of the capacitance detecting electrode;

$t_D$ (μm) is a thickness of the capacitance detecting dielectric film; and $\epsilon_D$ is a relative dielectric constant of the capacitance detecting dielectric film, the element capacitance $C_D$ is sufficiently larger than the sum of the reference capacitor capacitance $C_R$ and the transistor capacitance $C_T$, that is, $C_R + C_T$; and when a target capacitance $C_A$ is defined by the following expression:

$$C_A = \epsilon_0 \cdot \epsilon_A \cdot S_D / t_A$$

where $\in_0$ is a dielectric constant in vacuum;
$\in_A$ is a relative dielectric constant of air;
$t_A$ is a distance between the target and the capacitance detecting dielectric film; and
$S_D$ is the area of the capacitance detecting electrode, the reference capacitor capacitance $C_R$ being substantially larger than the target capacitance $C_A$.

19. A capacitance detecting device that reads surface contours of a target by detecting capacitance which changes according to a distance from the target, comprising:
M row lines and N column lines arranged in a matrix of M rows and N columns;
capacitance detecting elements arranged at intersections of the row lines and the column lines; and
a power line,
each of the capacitance detecting elements having:
a signal detecting element;
a signal amplifying element; and
a reset element,
the signal detecting element having a capacitance detecting electrode, a capacitance detecting dielectric film, and a reference capacitor,
the reference capacitor having a first electrode, a dielectric film, and a second electrode,
the signal amplifying element being composed of a thin film semiconductor device for signal amplification having a source electrode, a drain electrode, and a gate electrode,
the reset element being composed of a thin film semiconductor device for reset having a source electrode, a drain electrode, and a gate electrode,
a ground potential being applied to the power lines, and
the gate electrode of the signal amplifying element, the capacitance detecting electrode, the second electrode of the reference capacitor, and the drain electrode of the reset element being connected to each other,
wherein the first electrode of the reference capacitor and a column line are connected to each other.

20. A capacitance detecting device that reads surface contours of a target by detecting capacitance which changes according to a distance from the target, comprising:
capacitance detecting elements arranged in a matrix of M rows and N columns; and
a plurality of power lines to supply power to the respective capacitance detecting elements, each of the capacitance detecting elements having:
a) a signal detecting element to store electric charge corresponding to the capacitance;
b) a reset element to reset the electric charge stored in the signal detecting element; and
c) a signal amplifying element to amplify a signal corresponding to the electric charge stored in the signal detecting element,
the signal detecting element including:
a1) a capacitance detecting electrode;
a2) a capacitance detecting dielectric film provided on the capacitance detecting electrode; and
a3) a reference capacitor, the reference capacitor having a first electrode, a second electrode, and a dielectric film provided between the first electrode and the second electrode,
the signal amplifying element being composed of a thin film semiconductor device for signal amplification having a source electrode, a drain electrode, and a gate electrode,
the reset element being composed of a thin film semiconductor device for reset having a source electrode, a drain electrode, and a gate electrode, and
the gate electrode of the signal amplifying element, the capacitance detecting electrode, the second electrode of the reference capacitor, and the drain electrode of the reset element being connected to each other,
wherein the gate electrode of the reset element is connected to a column line adjacent to the column line in which the capacitance detecting element including the reset element is positioned.

21. A capacitance detecting device that reads surface contours of a target by detecting capacitance which changes according to a distance from the target, comprising:
M row lines and N column lines arranged in a matrix of M rows and N columns;
capacitance detecting elements arranged at intersections of the row lines and the column lines; and
a power line,
each of the capacitance detecting elements having:
a signal detecting element;
a signal amplifying element; and
a reset element,
the signal detecting element having a capacitance detecting electrode, a capacitance detecting dielectric film, and a reference capacitor,
the reference capacitor having a first electrode, a dielectric film, and a second electrode,
the signal amplifying element being composed of a thin film semiconductor device for signal amplification having a source electrode, a drain electrode, and a gate electrode,
the reset element being composed of a thin film semiconductor device for reset having a source electrode, a drain electrode, and a gate electrode,
a ground potential being applied to the power lines, and
the gate electrode of the signal amplifying element, the capacitance detecting electrode, the second electrode of the reference capacitor, and the drain electrode of the reset element being connected to each other,
wherein the gate electrode of the reset element being connected to a column line adjacent to the column line in which the capacitance detecting element including the reset element is positioned.

* * * * *